(12) United States Patent
Parkyn et al.

(10) Patent No.: US 7,674,019 B2
(45) Date of Patent: Mar. 9, 2010

(54) FREE-FORM LENSES FOR RECTANGULAR ILLUMINATION ZONES

(75) Inventors: William A. Parkyn, Lomita, CA (US); David G. Pelka, Los Angeles, CA (US)

(73) Assignee: Anthony, Inc., Sylmar, CA (US)

( * ) Notice: Subject to any disclaimer, the term of this patent is extended or adjusted under 35 U.S.C. 154(b) by 147 days.

(21) Appl. No.: 12/126,850

(22) Filed: May 23, 2008

(65) Prior Publication Data

US 2009/0040769 A1 Feb. 12, 2009

Related U.S. Application Data

(60) Provisional application No. 60/955,340, filed on Aug. 11, 2007, provisional application No. 61/046,448, filed on Apr. 20, 2008, provisional application No. 61/050,619, filed on May 5, 2008.

(51) Int. Cl.
*F21V 5/00* (2006.01)
(52) U.S. Cl. ............... 362/334; 362/332; 362/335; 362/338; 362/522
(58) Field of Classification Search ............. 362/308, 362/309, 332–340, 522
See application file for complete search history.

(56) References Cited

U.S. PATENT DOCUMENTS

| | | | |
|---|---|---|---|
| 3,425,056 A * | 1/1969 | Dawson | ............ 362/336 |
| 5,924,788 A | 7/1999 | Parkyn, Jr. | |
| 6,273,596 B1 | 8/2001 | Parkyn, Jr. | |
| 6,473,554 B1 | 10/2002 | Pelka et al. | |
| 6,582,103 B1 | 6/2003 | Popovich et al. | |
| 6,647,199 B1 | 11/2003 | Pelka et al. | |
| 7,021,797 B2 | 4/2006 | Minano et al. | |
| 7,042,655 B2 | 5/2006 | Sun et al. | |
| 7,347,599 B2 | 3/2008 | Minano et al. | |
| 7,377,671 B2 | 5/2008 | Minano et al. | |

* cited by examiner

*Primary Examiner*—Stephen F Husar
(74) *Attorney, Agent, or Firm*—Jeffer Mangels Butler & Marmaro LLP

(57) ABSTRACT

A light source emits light into a solid angle exceeding pi steradians with a known intensity distribution. An illumination lens has a first surface that receives at least 90% of the light of the known intensity distribution and has a shape that transforms the known intensity distribution into an intermediate intensity distribution within the transparent material of the lens. A second surface receives the intermediate intensity distribution and is shaped to transform the intermediate intensity distribution into a final intensity distribution that produces a prescribed illumination distribution upon a rectangular target zone. At least one of the shapes of the first and second surfaces is non-rotationally symmetric and is approximated by a super-ellipsoid.

12 Claims, 13 Drawing Sheets

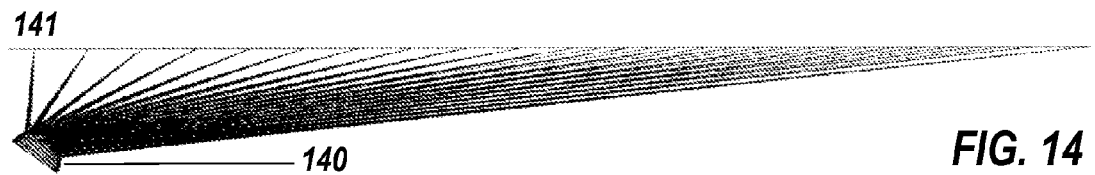
FIG. 14
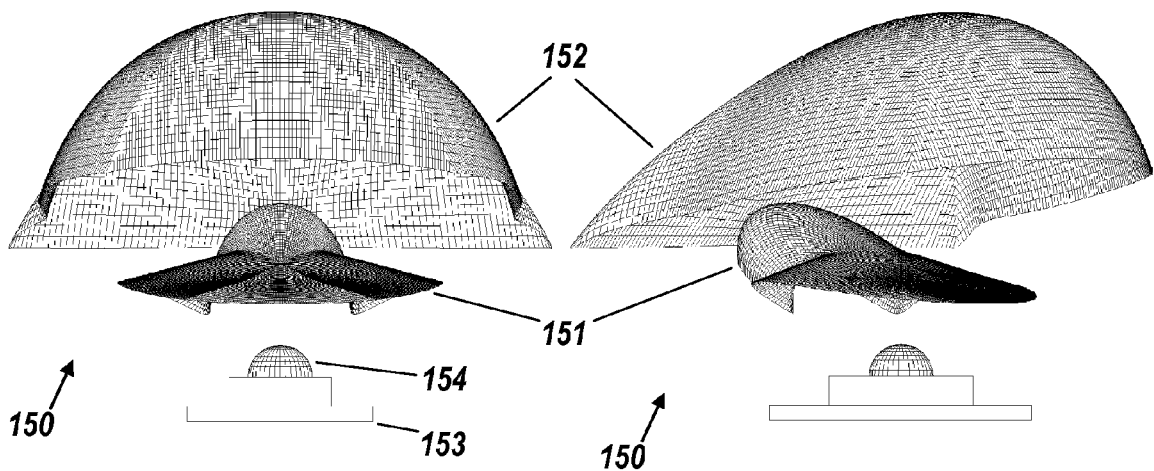
FIG. 15A  FIG. 15B
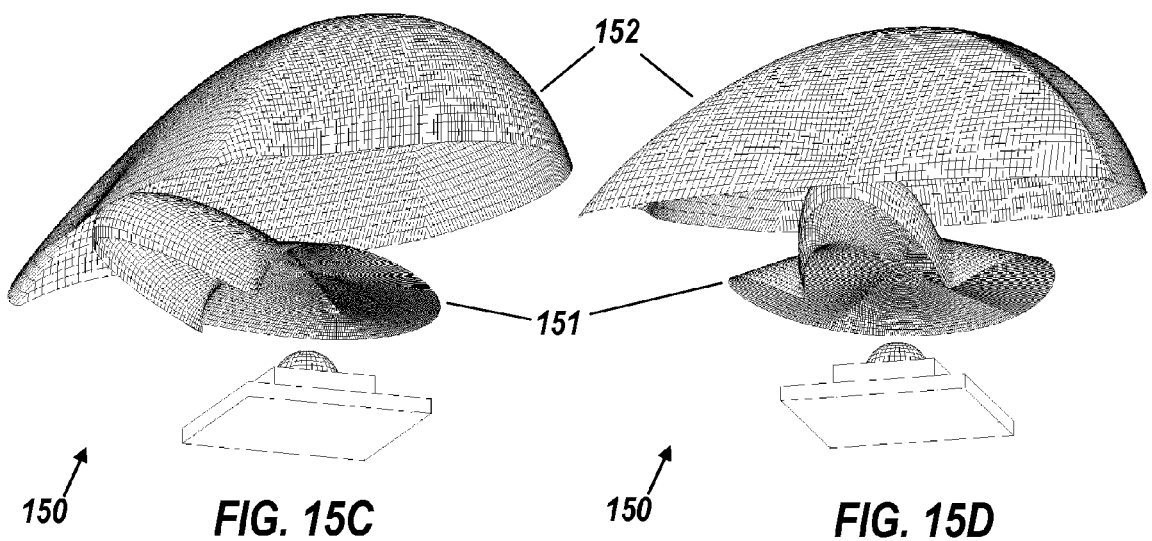
FIG. 15C  FIG. 15D

US 7,674,019 B2

FREE-FORM LENSES FOR RECTANGULAR ILLUMINATION ZONES

RELATED APPLICATIONS

The present application claims priority under 35 USC § 119(e) to U.S. Provisional Application No. 60/955,340 filed on Aug. 11, 2007, U.S. Provisional Application No. 61/046,448 filed on Apr. 20, 2008, and U.S. Provisional Application No. 61/050,619 filed on May 5, 2008, which are incorporated by reference herein.

BACKGROUND OF THE INVENTION

1. Field of the Invention

The present invention is generally in the field of illumination using electrical energy, and, more particularly, is in the field of illumination utilizing light-emitting diodes (LEDs).

2. Description of the Related Art

Solid-state lighting promises to become the major light source of the near future, not only to save energy but also because the small size and the high efficiency of LEDs promote far more versatility of applications than did previous lighting technology. This in turn has stimulated the field of illumination optics, which previously was nearly all reflective, with lenses confined only to such expensive niche applications as stage lighting. Of the numerous illumination applications that have recently adopted LEDs as the light sources, many have lenses specifically designed for them. The lenses are inexpensive plastic devices, which are much easier to integrate than glass parts. A majority of these illumination applications are circularly symmetric, which makes both design and mold-fabrication much easier, and best matches the hemispherical output geometry of LEDs. The prevalence of circular output-beams means that rectangular zones of desired illumination may not be properly served. Previous patents, such as, for example, U.S. Pat. Nos. 5,924,788 and 6,273,596 to Parkyn, Jr., and U.S. Pat. No. 7,042,655 to Sun, Falicoff and Parkyn, Jr. address this need in similar ways, having in common the basic method of corresponding flux-tessellations utilizing identical grids with cells of identical flux but variable size laid out for both source and output beam on the unit sphere of directions. Subsequent advances by an inventor herein have applied recent mathematical advances in computer graphics to originate a new and improved way to design illumination lenses that are not circularly symmetric. In general, surfaces that are not rotationally symmetric have come to be encompassed by the term "free-form."

The embodiments and design methods disclosed herein are encompassed by the field of nonimaging optics. The general problem addressed herein is how to design free-form surfaces that transform the intensity distribution of a point source (i.e., a 1 millimeter LED relative to a 1 inch lens) into a uniform illumination distribution on a target. In particular, the problem of rectangular targets has been neglected in the prior art except for the above-referenced patents of the Inventor. The general problem of transforming the intensity distribution of a source is exactly posed in abstruse mathematical terms by Roland Winston et al., in *Freeform Optical Designs for Point Sources in 3D, Nonimaging Optics*, Section 7.7, Elsevier Academic Press, 2006, pages 173-178, which is hereby incorporated by reference herein. No examples are given, however, of any actual application of these formulae.

A free-form surface is the solution of a constrained three-dimensional partial differential equation, a subject without much mathematical literature. Only in the image-processing specialty of shape-from-shading is the subject of surface synthesis explored in any detail. In that field, however, the problem is the recovery of terrain or surface detail that is known already to exist, so that a mathematical solution is guaranteed and rectangular geometry is inherent from the outset. In free-form lens design, however, solutions are not guaranteed and the basic geometry is spherical. In summary, the field of the invention is relatively undeveloped, particularly so for illuminating rectangular zones uniformly.

SUMMARY OF THE INVENTION

The design methods and preferred embodiments disclosed herein produce novel and highly efficient lens configurations for solid-state lighting. The wide angles into which an LED radiates light generally encompasses most, if not all, of a hemisphere surrounding the LED. The wide angles require the lens to be broad enough to cover most or all of the surrounding hemisphere. Accordingly, the surface integration must be done in spherical coordinates, which creates an incompatibility with the rectangular geometry of the target zone because spherical rectangles cannot totally cover hemispheres. The free-form lens-design method disclosed herein begins with a novel pseudo-rectangular grid to attain a further objective, the redistribution of the LED's hemispheric light onto a rectangle, with none of the leftover light of conventional grids.

Modern injection-mold technology has full capability to fabricate arbitrary lens shapes, given their detailed mathematical description in such public formats as IGES or Solid-Works. What is needed is a design method for illumination optics that is equally versatile. The preferred embodiments disclosed herein are examples of the capabilities of a general design method for free-form illumination optics, one that is particularly well suited to service such rectangular targets as refrigerated display shelves, book shelves, stair steps, and paintings, as well as the usual walls, ceilings, and floors. The small size of an LED (e.g., a few millimeters) enables the construction of small luminaires (e.g., under an inch across), which allows novel placement of the LED, sometimes close to the target of the illumination. A widespread example of close placement is an LED positioned only 5 inches from a 30-inch shelf in a refrigerated display case for a supermarket. The challenge of this geometry is the $\cos^{-3}$ dependence of intensity, which requires 25 times more intensity towards the edge of the pattern and 82 times more intensity towards the corners of the pattern than is required just in front of the lens, the on-axis direction towards which an LED with no lens would have its maximum candlepower. A lens meeting this uniform-rectangle requirement would have a source magnification that was less than unity for straight ahead and highest towards the corners. This requires a free-form lens, capable of varying its intensity with azimuth, whereas a circularly symmetric lens can only vary its intensity with off-axis angle, with no azimuthal variation.

In all but gradient-index lenses, the deflections required to properly redistribute light rays is due to refraction entering or exiting a lens, which is determined by the angle between the surface normal vector and the local vector flux of light from various points on the source. The individual light rays are not affected by the overall lens shape, but are affected only by the local slope values of the lens surfaces, the space integration of which engenders the actual lens shape. The greatest challenge of such lenses is that the required output intensity distribution for uniform illumination of a planar target, when expressed in the spherical geometry of the hemispheric emission of light, leads to a distribution of surface normals that is not integrable. This means that the derivation of the surface function z(x,y)

from the required distribution of slopes ∂z/∂x and ∂z/∂y, equivalent to north-south and east-west ground slopes, may not add up to a smooth surface. Jagged roughness results when these derivatives vary wildly from point to point, whereas local smoothness results from their slow variation. Nonetheless, global discontinuities in the form of abrupt cliffs can result from many well-behaved surfaces, such as the screw shapes (i.e., helicoids). These result from the accumulation of small local departures from the condition $\partial^2 z/\partial x \partial y = \partial^2 z/\partial y \partial x$, which is imposed by Stoke's theorem to ensure surface continuity in both directions thereupon.

In general, coupling an axially symmetric light distribution into a rectangular light distribution generates a set of surface normals that is in varying degrees not integrable into a single smooth surface. Rather, the set of surface normals potentially exhibit significant inequality of cross-derivatives, particularly at the far corners of rectangles located subtending large solid angles. Strict adherence to integrability could result in segmented lenses with radial cliffs, an undesirable configuration from both manufacturing and performance standpoints. An objective of the disclosed lens-design method is to supply the cliff-less free-form surface having departures from uniformity of target illumination that favor the farthest part of the target, which are the most difficult to adequately illuminate due to their distance and slant. A further objective is to utilize the minimum lens size that accomplishes a given level of corner illumination. Improvement in the efficacy of LEDs is entirely a matter of increased luminance, which is multiplied by the projected area of the source image in the lens to give the candlepower of the lens in a particular direction. The source image is another name for the magnified, or demagnified, appearance of the lit LED when viewed through the lens from the direction of a place in the target zone. This magnification is the result of the curvature of the lens surfaces as encountered by wavefronts entering and exiting the illumination lens. These surface curvatures are specified locally by the aforementioned second partial derivatives.

An aspect of an embodiment in accordance with the present invention is an illumination system in which a light source emits light into a solid angle exceeding pi steradians with a known intensity distribution. An illumination lens has a first surface that receives at least 90% of the light of the known intensity distribution and is shaped to transform the known intensity distribution into an intermediate intensity distribution within the transparent material of the lens. The lens has a second surface that receives the intermediate intensity distribution and is shaped to transform the intermediate intensity distribution into a final intensity distribution that produces a prescribed illumination distribution upon a rectangular target zone. At least one of the shapes of the first and second surfaces is non rotationally symmetric and is mathematically generated by identifying a rectangular grid on the target, establishing a sphere-covering pseudo-rectangular grid on the solid angle of the source emission in correspondence with the rectangular target grid, such that (1) the pseudo-rectangular grid has the same proportions and the same number of cells as the rectangular target grid, (2) the cells of the rectangular grid on the target and the cells of the pseudo-rectangular grid have the same relative assignment of light flux, and (3) each cell has a representative central ray. The various surfaces generated by the method disclosed can be closely approximated by super-ellipsoids.

BRIEF DESCRIPTION OF THE DRAWINGS

The foregoing aspects and other aspects of this disclosure are described in detail below in connection with the accompanying drawing figures in which:

FIG. 14 illustrates an oblique illumination pattern;

FIGS. 15A, B, C, & D illustrate views of a lens for producing the oblique illumination pattern of FIG. 14;

DETAILED DESCRIPTION OF A PREFERRED EMBODIMENT

A better understanding of the features and advantages of the preferred methods and embodiments disclosed herein will be obtained by reference to the following detailed description of the preferred embodiments and accompanying drawings, which set forth illustrative embodiments in which the principles of the invention are utilized.

The design of refractive free-form illumination optics will encounter a fundamental difficulty when large solid angles are involved, particularly in the case of light-emitting diodes (LEDs), which emit into a hemisphere. There is a topological mismatch between a rectangular target and the hemispheric or quasi-hemispheric (60° or more off-axis) emission of most LEDs.

Figure 1A:
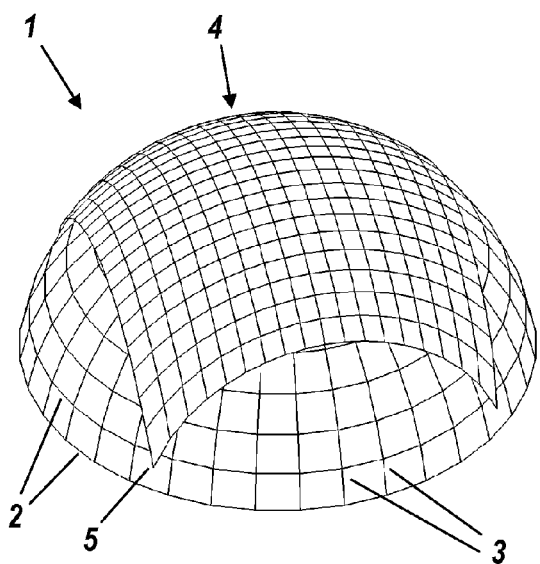
FIG. 1A illustrates a rectangular grid overlaid on a spherical cap.

FIG. 1A illustrates a unit-radius spherical cap 1 that represents the angular coverage of an LED emitting out to 60° off-axis. The cap 1 has a polar grid comprising co-latitude circles 2 extending to 60° off-axis and meridians 3. A rectangular grid 4 is overlaid upon the cap 1 with a corner 5 of the rectangular grid 4 showing the great distortion imposed by this spherical geometry. Each cell in the rectangular grid 4 would receive the same flux from a Lambertian point emitter (not shown) at the center of the cap 1. The rectangular symmetry of the grid 4 is incompatible with the spherical symmetry of the cap 1, which results in considerable leftover flux (e.g., approximately one third). The grid 4 has a total solid angle that collects an amount of flux equivalent to all Lambertian emission out to only 45°, but it goes nearly to 60° to accomplish this.

Figure 1B:
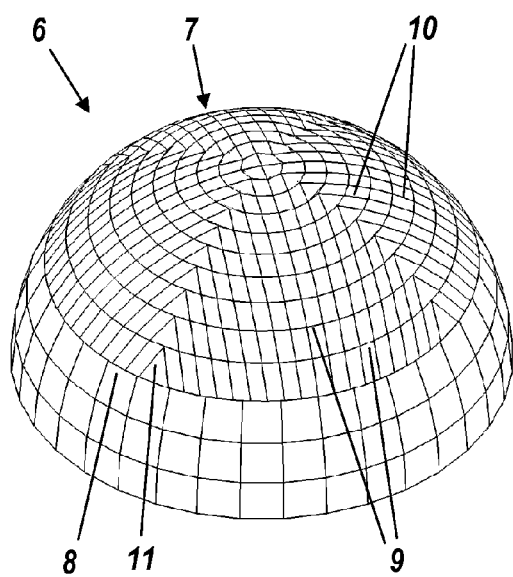
FIG. 1B illustrates a pseudo-rectangular better fitting on the same cap.

FIG. 1B illustrates a unit-radius spherical cap 6, with a polar grid identical to that of FIG. 1A. A pseudo-rectangular grid 7 extends over the cap 6 down to a 45°-colatitude line 8. (As used herein, "colatitude line" refers to the points at equal latitude-angles from the pole of the spherical cap 6.) Although the grid 7 perfectly covers a circular section of the cap 6, the grid 7 has a rectangular organization, forming 20 rows of 20 columns of cells, each cell of the grid receiving the same flux from the central Lambertian emitter, the same as the truly rectangular grid 4 of FIG. 1A. The grid 7 includes corner cells 11, which are triangular in shape so as to squeeze the square grid 7 into the round hole defined by the 45°-colatitude line 8.

Figure 2:
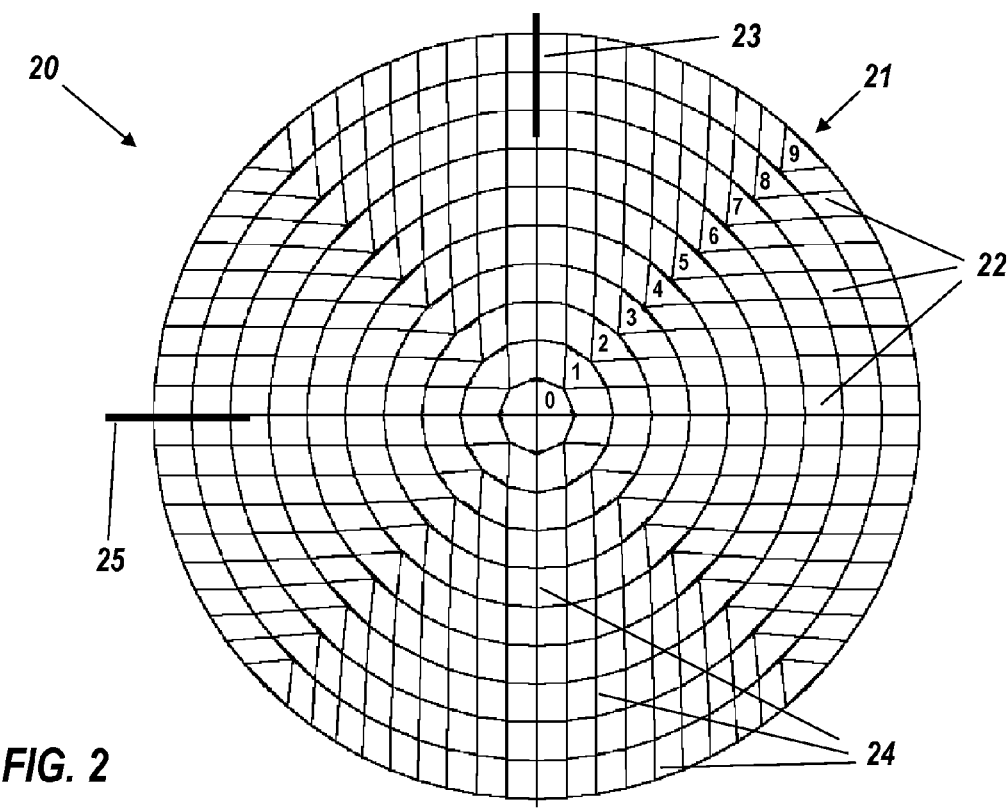
FIG. 2 illustrates is a plan view of a pseudo-rectangular grid.

FIG. 2 illustrates a plan view of a pseudo-rectangular spherical grid 20 that comprises circular tiers numbered 0 to 9 along diagonal cells 21. The $n^{th}$ tier comprises $4(2n+1)$ cells, which show the quadrilateral symmetry of the grid 20. Furthermore, the tiers form circles of respective constant colatitudes around an axis through the center of the grid 20 and perpendicular thereto (e.g., the axis through the center of the grid 20 points upward from the plane of the sheet on which FIG. 2 is presented). A set of lines 22, shown as horizontal lines in the view of FIG. 2, demark cell boundaries which are latitude lines about an axis 23. The axis 23 is perpendicular to the axis of grid 20 and is shown as a vertical line in the view of FIG. 2. Similarly, a set of lines 23 demark cell boundaries which are latitude lines about an axis 25. The axis 25 is also perpendicular to the axis of grid 20 and is shown as a horizontal line in FIG. 2. The lines 22 and 24 curve slightly inward as they approach the pole, which adjusts the cell sizes for identical solid angle all the way around the pole. The various colatitudes of the circular tiers can be relatively sized to ensure that the cells all receive the same flux from the central source. Thus, the pseudo-rectangular grid 20 has a triaxial basis. The adaptability of the grid 20 to a spherical shape rather than a planar shape means that the grid 20 can cover as much of a hemisphere as desired, with whatever number of cells necessary for numerical precision and stability. As previously referenced, the basic idea originated from the need for rectangularly connected parallel processors to cover spherical grids, particularly for global weather simulations. The design method disclosed herein is the first to utilize this grid for the rectangular apportionment of hemispherically emitted light flux.

Figure 3A:
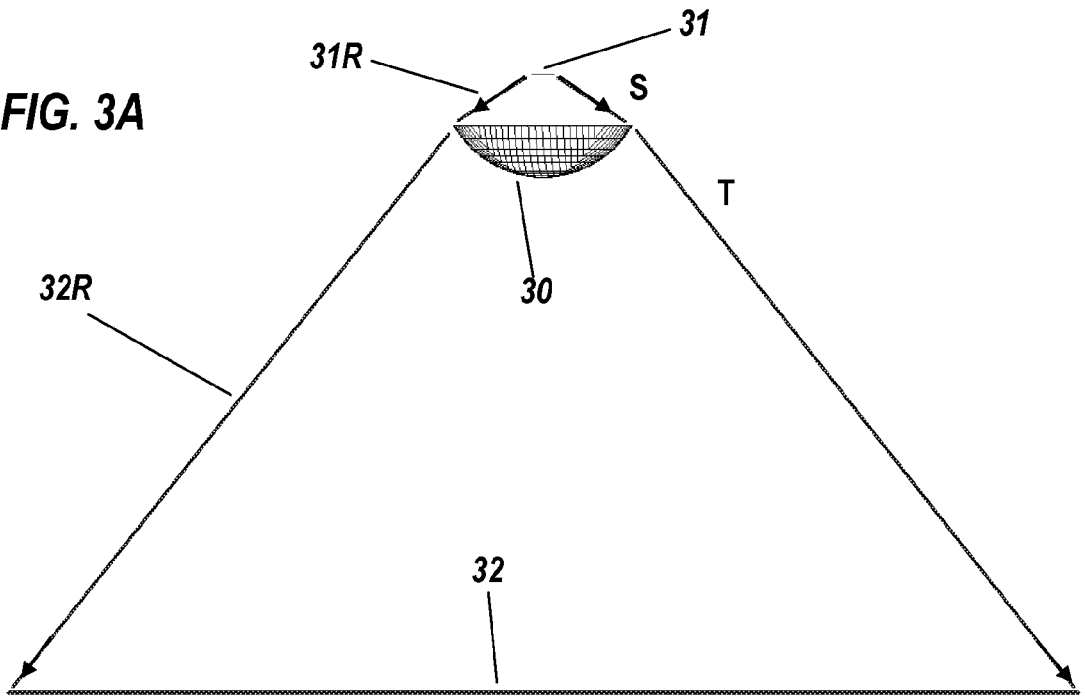
FIG. 3A illustrates a side view of a target-illumination requirement.

FIG. 3A illustrates the particulars of rectangular flux apportionment, with a side view of an exemplary illumination requirement for uniform illumination on a rectangular target grid 32 that subtends an angle of 22° vertically by an angle of 45° horizontally. The horizontal subtended angle is illustrated by a pair of edge rays 32R. A small light source 31 emits light bounded by the edge rays 31R, shown at 60° off-axis, as for example exhibited by the decade-old SuperFlux LED package and more recently by the 7090 series LEDs of the Cree Corporation. The pseudo-rectangular source grid 30 extends spherically to receive 60° edge rays 31R and, in the same way as FIG. 2, comprises a multiplicity of cells that are so sized in solid angle as to receive the same flux from the small source 31.

Figure 3B:
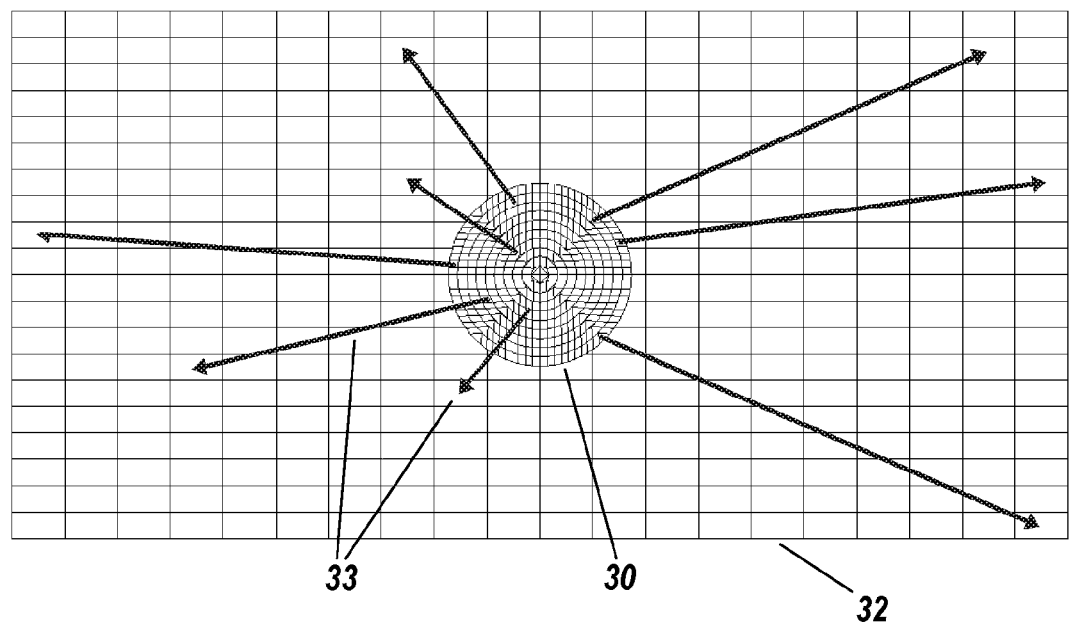
FIG. 3B illustrates a plan view of the target-illumination requirement of FIG. 3A.

FIG. 3B illustrates a plan view of the same diagram, showing the source grid 30 and the target grid 32. The production of uniform illumination reduces to the individual deflection of the source-rays going into the cells of the source grid 30. These deflections must be into the corresponding cells of the target grid 32, as shown by a plurality of exemplary assignment rays 33. If each cell of the grid 30 refractively achieves these ray-deflections, then this flux-redistribution describes the action of the desired illumination lens. In this wise lies the merit of the pseudo-rectangular organization of the source grid 30, a key ingredient in the design method disclosed herein for producing such a lens for a very wide combination of LED sources and target configurations.

As will be seen, the general design method disclosed herein is in no way limited to that angle. Moreover, the millimeter-scale dimensions of the LED chip make it close enough to a point source for the design of illumination lenses more than a half-inch across. This is the meaning of the aforementioned term "small source." The importance of this size factor can be appreciated by considering the lit appearance of an illumination lens when viewed from the target. The rays which go to the corner-most cells of the target grid 32 must have the greatest intensity because of the inverse cosine-cubed dependence upon off-axis angle of illumination relative to intensity. Now all any illumination lens can do to heighten or reduce its intensity in any direction is to produce a magnified or demagnified image of the source, as viewed from that direction. Once the source image extends across the entire lens, maximum intensity has been attained. If the lens is too small to deliver the maximum intensity, then corner illumination will be short-changed. Thus the minimum lens size is simply that with a source image that never quite fills the entire lens, as viewed from the most difficult corner of the target. Corner illumination will trade off against the square of the lens size. This is important because lens production-cost has a proportionality somewhere between the square and the cube of the lens size, making the 0.5 inch to 1 inch range of greatest interest for LED-based illumination lenses. Even more significant are multiple-chip packages, such as those by the Osram Corporation, with nine chips within a 3.5 mm square.

With proper heat sinking such LEDs can emit over a thousand lumens, yet they are still small enough to act as light sources herein.

Figures 4A, 4B, 4C:
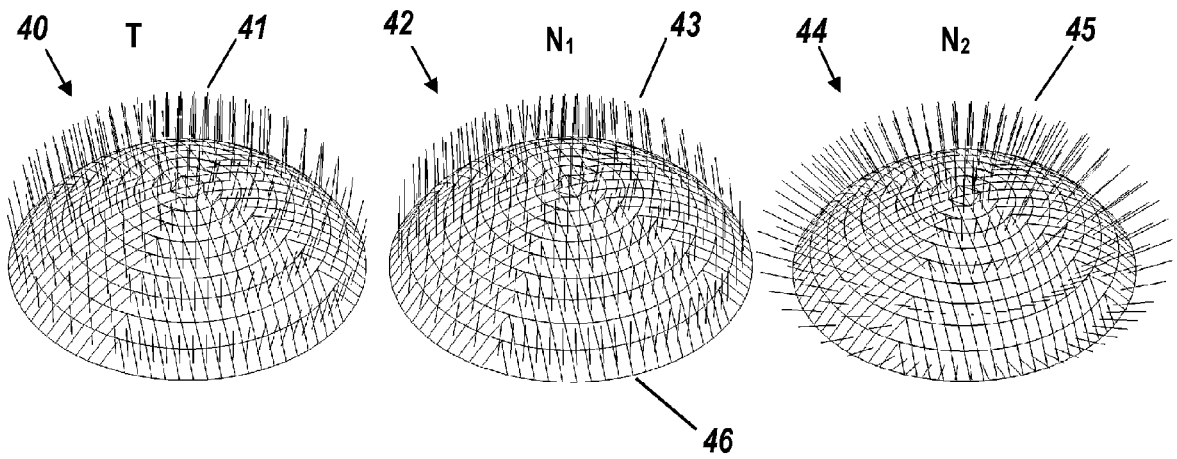
FIG. 4A illustrates a needle diagram of the required deflections.
FIG. 4B illustrates a needle diagram of the surface normals of the inside lens surface.
FIG. 4C illustrates a needle diagram of the surface normals of the outside lens surface.

Coming closer to the topic of how to design an illumination lens, the action of the lens surfaces can be illustrated by needle diagrams, which show the attachment of direction vectors to the cells of the aforementioned pseudo-rectangular spherical source grid in the form of needle-like lines pointing to the corresponding target-grid cells. FIG. 4A illustrates a source grid 40 with the same pseudo-rectangular organization as in previous figures. Every other circular tier of grid cells is shown with direction-designating needles 41 aligned towards the corresponding cells of the target (not shown, but the same as in previous Figures), analogous to the longer distance-designating arrows 33 of FIG. 3B. These needles, however, all have the same length, highlighting their conveyance of directional information only. The greatest required deflections are on the outermost tier, from 60° off-axis initially down to the range of about 11° to about 22.5°. These 37.5° to 49° deflections are too much for a single refraction and are nearly too much for the two successive refractions achieved by the two surfaces of the illumination lens. FIG. 4A can be considered the needle diagram for the rectangular-illumination requirement of FIG. 3.

Generally, the two successive refractive deflections by the lens surfaces would each be half of the overall deflection shown in FIG. 4A, although other than an even split may sometimes be in order. Because both distortion and reflective losses mount nonlinearly with the size of the deflection, the losses are minimized by the even split. Mathematically, each cell of the source grid 40 represents a unit direction vector $S[i,j]$, where i and j are its pseudo-rectangular indices. The indices are integers that range from $-N$ to $+N$ for a selected integer N, such as 10 for the source grid 40, but 50-100 for precise shape specification. Each of the needles 41 represents a further unit-length direction vector $T[i,j]$ pointing to the proper cell of the rectangular target. The lens comprises a dielectric material with a refractive index n. Within the lens, the rays of each cell have an intermediate direction vector $I[i,j]$ which is necessarily somewhere in between the two unit direction vectors. Ray vectors in air have length one, but within the medium they have magnitude n. This is expressed by:

$$I[i,j]=n\{x[i,j]S[i,j]+(1-x[i,j])T[i,j]\}, \text{ where } 0<x[i,j]<1$$

The foregoing expression represents the ability to vary the apportionment x of the deflection load required of the two surfaces. Such variability must be gradual; otherwise, creases may arise in the surface generated. This allows the designer for force one of the two surfaces to take a prescribed form, such as a rotationally symmetric shape.

In the case of a small deflection, when either surface can easily do all of it, such may be desirable if some convenient shape, such as a plane or sphere, can be utilized instead of a free-form one that turns out to be quite close to it. Part of the design method of the present invention is the ability to re-adjust the weights to generate various lens-versions with the same set of source and target vectors. This can be particularly important in seeking to minimize lens thickness and thus molding cost. With the large deflections shown in FIG. 3A, however, the split must stay nearly even (e.g., $x \approx \frac{1}{2}$). This spatial variation of bend load (i.e., of the intermediate vector I) is one of several degrees of freedom in the illumination-lens design method disclosed herein.

Given the three vector arrays S, I, and T (indices skipped), there will be unique arrays of unit normal vectors, $N_1$ for the inside surface and $N_2$ for the outside. The normal vectors are calculated for each (i,j) by:

$$N_1 = \frac{I-S}{\|I-S\|}$$

and $$N_2 = \frac{T-I}{\|T-I\|}$$

These calculations of $N_1$ and $N_2$ are easily implemented by a computer for the entire array of vectors, resulting in the needles shown in FIG. 4B for $N_1$ and the needles shown in FIG. 4C for $N_2$.

FIG. 4B illustrates a pseudo-rectangular source grid 42 with an array 43 of needles corresponding to the normal vector array $N_1$. The needles point predominantly upwards, meaning that the lower surface of the lens will be relatively flat. A point 46 shows a typical start-point for integrating the surface out of this array of normal vectors, as will be discussed in more detail below.

FIG. 4C illustrates a pseudo-rectangular source grid 44 with an array 45 of needles corresponding to the normal vector array $N_2$. The steep angles on the outer tier mean that the resulting lens will be relatively thick. In a circularly symmetric lens, the lens would be faceted in the fashion of Fresnel lenses, but that option is expected to be difficult to fabricate in non-circular shapes, although the option remains within the scope of this application.

The derivation of the shape of a particular preferred embodiment of an illumination lens proceeds from the normal vector arrays of FIGS. 4B and 4C, basically as the numerical integration of a differential equation to generate the surface function $z(x,y)$ of upper and lower surfaces. In the case of a crossed-functional surface, the specification has the form $z(x,y)=u(x)v(y)$, and the differential equation reduces to two independent equations. In such a case, each point of the surface can be derived without regard to adjacent values because the independence of the x and y dimensions assures surface continuity. This can be called a raster pattern in that each scan line $u(x)$ is generated independently of adjacent ones. In general, the method of this application cannot be so reduced to such a solution.

Figure 5:
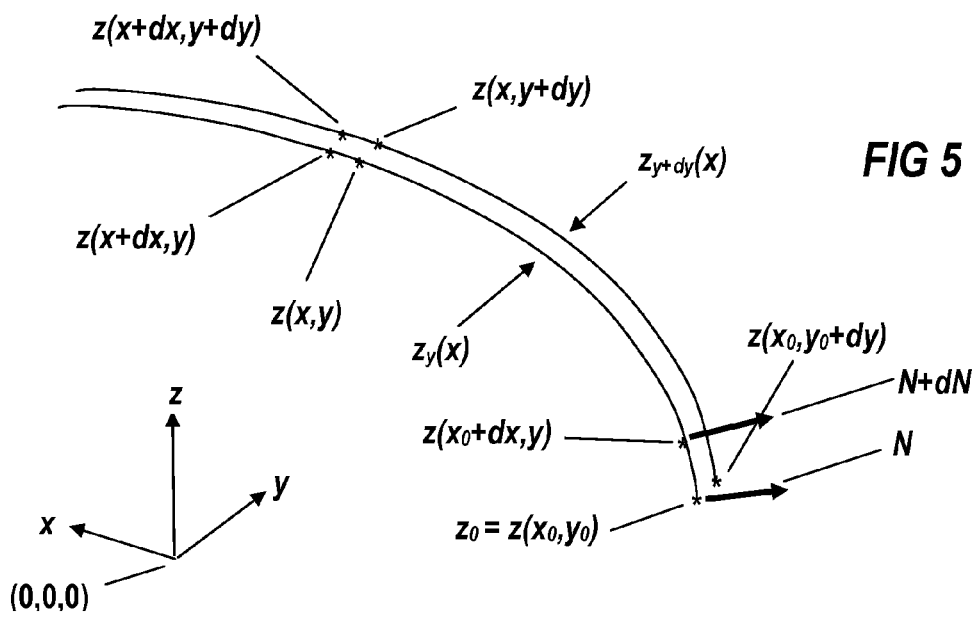
FIG. 5 illustrates two adjacent characteristic strips of a free-form surface illustrating the two-dimensional integration process.

Generating a free-form surface from a set of normal vectors comprises a two-dimensional integration of the partial differential equation that the vectors represent. Before modern computers it was a surprisingly little-studied subject in applied mathematics. This application is the first time it has been applied to generate optical surfaces from pseudo-rectangular illumination grids. As shown in FIG. 5, the integration proceeds from a pre-set initial point $z_0=z(x_0,y_0)$ for a sufficiently small distance dx, so that $z(x+dx, y)=z(x,y)+dx \cdot (\partial z/\partial x)$, which ignores all higher-order derivatives by assumption of overall lens smoothness. The partial derivative $(\partial z/\partial x)$ issues from the surface normal vector $N(x,y)$ according to its scalar components $$N_1=i \cdot N, N_2=j \cdot N, \text{ and } N_3=k \cdot N$$

(for the usual Cartesian unit vectors) by the relations $\partial z/\partial x = N_3/N_1$ and $\partial z/\partial y = N_3/N_2$. The integration proceeds to calculate $z(x+2dx, y)$, $z(x+3dx, y)$, etc., forming what is called a characteristic strip of the surface, designated $z_y(x)$, with its neighboring strip called $z_{y+dy}(x)$. Computing the entire surface involves successively calculating such strips at all desired values of y, starting with the initial strip and proceeding next to the initial point of the next strip, at $(x_0, y_0+dy)$ and calculating $z(x_0, y_0+dy)=z(x,y)+dy(\partial z/\partial y)$, then further points $z(x_0, y_0+2dy)$, etc.

As shown in FIG. 5, when adjacent characteristic strips $z_y(x)$ and $z_{y+dy}(x)$ are compared, surface consistency requires $z_{y+dy}(x)=z_y(x)+dy(\partial z/\partial y)$ for every value of x. This is expressed by the well-known cross-derivative equality condition:

$$\frac{\partial^2 z}{\partial x \partial y} = \frac{\partial^2 z}{\partial y \partial x}$$

The foregoing expression comes from applying Stoke's theorem to the condition of the surface having no cliffs (i.e., no surface inconsistency). This constraint can be used during the surface-generation process of the design method disclosed herein, when a new characteristic strip $z_{y+dy}(x)$ is being generated. As shown in FIG. 5, a new point $z(x+dx, y+dy)$ must be compared with points $z(x,y)$ and $z(x+dx, y)$ on the previous characteristic strip $z_y(x)$ and the previous point $z(x, y+dy)$ on the strip currently being calculated. If the normal vectors are not completely integrable (as will be typical when illuminating rectangular targets), two slightly different values of $z(x+dx, y+dy)$ will be derived, one from $z(x, y+dy)$ and the other from $z(x+dx, y)$. A compromise value can be selected to lie somewhere in between them to minimize the deviation of the surface's normal vector from the desired value.

Figure 6:
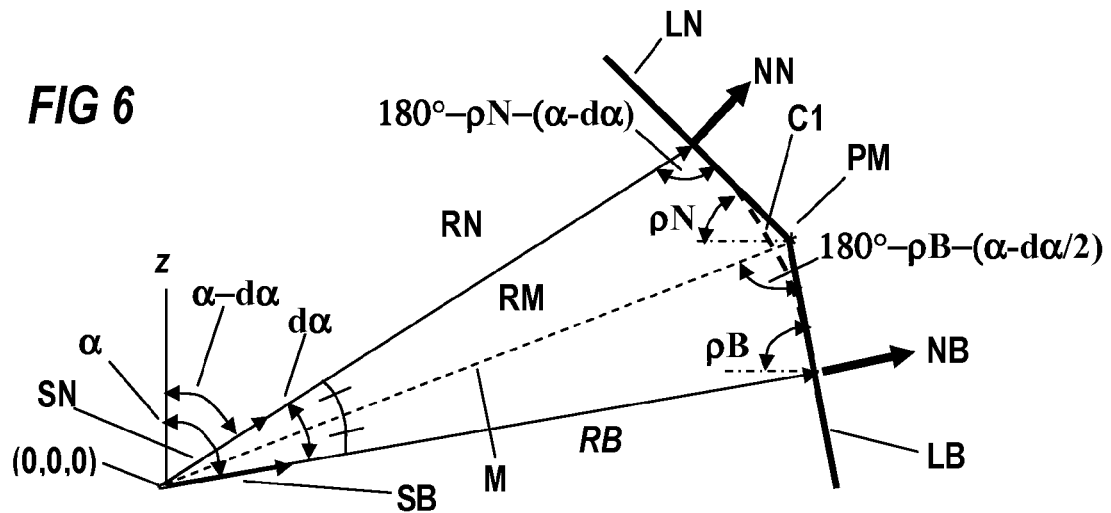
FIG. 6 illustrates how a new point is calculated on the inside surface

While FIG. 5 shows the general idea of a characteristic strip, the actual algorithm of calculating such a strip from a set of normal vectors does not necessarily utilize partial derivatives, since vector mathematics is actually more convenient. FIG. 6 shows how a new interior-surface point is derived from a known basis point adjacent to it. The illumination-lens design disclosed herein utilizes the above-mentioned known surface-normal vectors to numerically derive smooth interior and exterior surface shapes having normal vectors close to this set, utilizing a spatial coordinate system with its origin (0,0,0) at the luminous centroid of the light source. The pseudo-rectangular set of directional unit vectors S[i,j] is placed at the origin. One unit vector is placed for each of the cells in FIG. 2, which are sized to represent equal amounts of light from the small source. Since LEDs usually emit axisymmetrically, this flux adjustment is generally done by proper adjustment of the co-latitudes of the cell boundaries in the pseudo-rectangular grid, such as lines 9 of FIG. 1B. A light ray emitted into each directional cell will propagate away from the LED until it encounters the interior surface of the lens at some distance that is to be calculated in order to specify the lens shape. Thus the interior surface is generated before the exterior surface because every point R[i,j] on the interior surface is located somewhere along a spatial extension of the known directional unit vector S[i,j] issuing from the center of the light source (primarily contemplated as a light-emitting diode, but any small hemispherically emitting light source is possible). The location vector $R_i[i,j]$ of each surface element has a scalar magnitude $|R_i[i,j]|$ equal to the distance from source to that point on the lens surface, so that $R_i[i,j]=|R_i[i,j]|S[i,j]$ so that only that the magnitude need be calculated.

As long as the lens is, for example, ten times larger than the source, its absolute size is arbitrary, because it is the lens shape that redistributes the light. Typically a lens diameter is specified, and the maximum off-axis angle $\alpha_{MAX}$ from the light source is selected (typically 60-90°). This determines a single known point on the lens surface, from which an iteration can begin that will calculate a first characteristic strip, as in FIG. 5. Typically this numerical iteration runs from the edge of the lens, at the known starting point, through its center to the other side, defining the central spine of the lens. When the lens is intended to illuminate a tilted rectangle, the far side of the lens profile will not be symmetrical with the near side. The angular distribution of the source's intensity determines the layout of the pseudo-rectangular grid of source vectors S[i,j], but typically it will be a spherical cap extending down to colatitude $\alpha_{MAX}$, such as the 45° value shown in FIG. 1B.

The usual initial conditions for lens design are the aperture radius r of the lens, so that the source angle $\alpha_{MAX}$ determines the height h above the source of the rim of the lens (h=r/tan($\alpha_{MAX}$)), fully specifying the location R[0,N]=[r,0,h], for which the unit vector S is shown as the point 46 in FIG. 4B. This is the seed point to derive the entire grid of points on the interior surface of the lens, after which another grid is generated to specify the exterior surface. From these two numerical listings of all the surface points interior and exterior, a polynomial approximation enables each surface to be specified much more compactly. It is expected that most situations of illuminating a rectangle, even if oblique, will have right-left symmetry rather than being closest to a corner of the rectangle. Thus there will be a central line of symmetry (a spine) on the lens surface, enabling it to be made the initial, or zeroeth, row, so that it can be derived one-dimensionally (i.e., the spine is a planar curve, whereas most characteristic strips will be space curves).

FIG. 6 is a schematic diagram of the calculation of the unknown distance RN from the source to the next point in the iteration, along the direction of the known unit vector SN, given the known distance RB to an adjacent basis point. The basis point is at known off-axis angle $\alpha$, while the next point is at an angle that is less by a small angle $d\alpha$ (typically 0.1° to 0.5°, but shown here greatly exaggerated, as are the differences between the directions of the two normal vectors). The known surface normal unit vectors NB and NN have associated tangent line-segments LB and LN, which are respectively perpendicular. The proper distance RN is defined such that a mid-point PM, where LN intersects LB, will lie on dotted bisector line M, at distance RM from the source at an origin (0,0,0). For any two tangent lines such as LB and LN, there is a unique parabolic arc, drawn as dotted curve C1, which is tangent to both. Specifically, tangent line LN slides along the ray extending from unit vector SN until the tangent line LN reaches the spot where the tangent line LN intersects the tangent line LB at a point PM that is on the dotted mid-line M. Then this intersection point PM becomes a control point in the powerful Bezier-curve formulation of surface shape, as discussed in Chapter 3 of Gerald Farin, *Curves and Surfaces for Computer-Aided Geometric Design*, 4th Edition, Academic Press, San Diego, 1997, which is hereby incorporated by reference herein.

In FIG. 6, the unknown distance RM to the intersection point PM is calculated from known distance RM according to the trigonometric law of sines:

$RM/\sin(\rho B+90°-\alpha)=RB/\sin(\rho B+\alpha-\tfrac{1}{2}d\alpha)$

Similarly, RN is calculated in turn from RM as:

$RN/\sin[\rho N+90°-(\alpha-\tfrac{1}{2}d\alpha)]=RM/\sin(\rho N+\alpha-d\alpha)$ With this new point now known, the new point can become the basis for deriving the next new point, until the entire curve is calculated.

Figure 7:
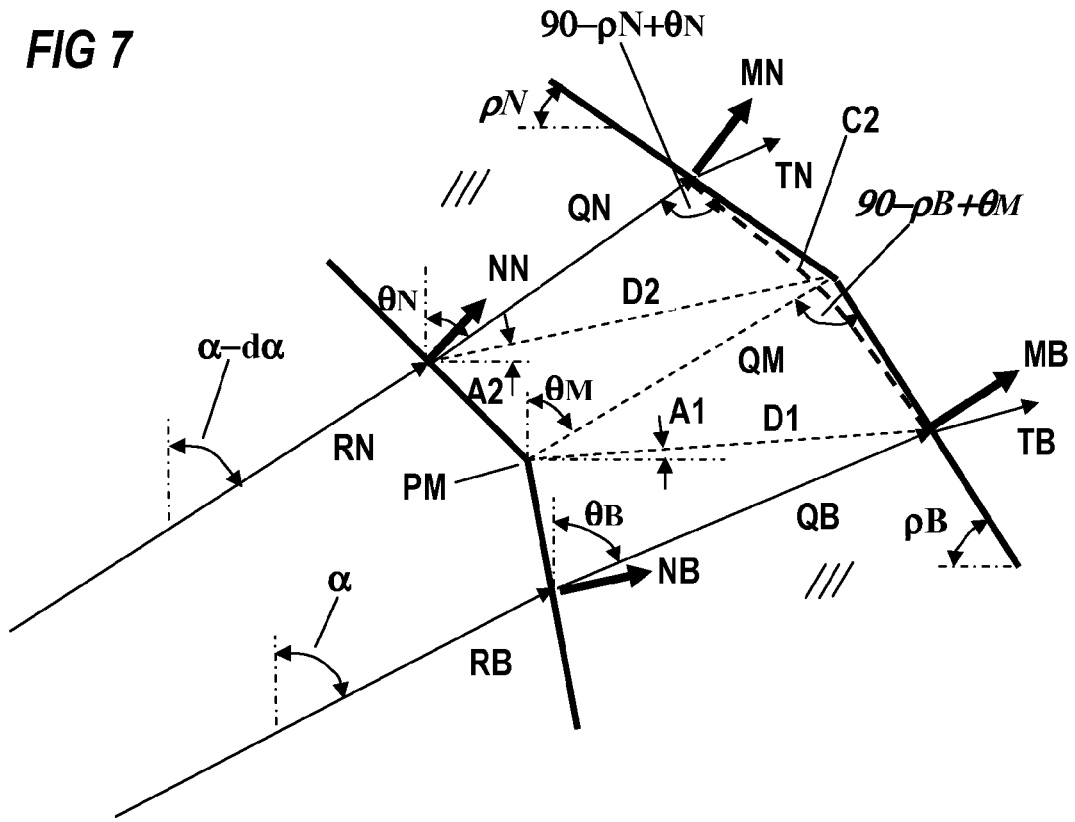
FIG. 7 illustrates how a new point is calculated on the outside surface.

With the interior surface known, the rays of light from the central source will enter the lens and be refracted into paths with direction vectors given by the abovementioned set of intermediate unit vectors I. The distance to the exterior surface of the lens must be determined as propagating along each one of these paths. FIG. 7 illustrates the continuation of the trigonometric calculation of FIG. 6, with the previous distances RB and RN shown along with the off-axis angles α and α−dα and the point PM. The previously known external surface point, at the base of vector MB, is at distance QB from the known internal surface point on ray RB, with known off-axis angle θB, and with angles θM also known. This known exterior point, with unit vector TB towards the target destination of the ray, has a known distance D1 from the point PM on a heading given by an angle A1 Then the law of sines gives QM via the relation:

$QM/\sin(\rho B+A1)=D1/\sin(\rho B+\theta M)$

With QM now known, the distance D2 and angle A2 are determined next, enabling the derivation of the distance QN from the law of sines as:

$QN/\sin(\rho N+A2)=D2/\sin(\rho N+\theta N)$

The diagram of FIG. 7 also exaggerates the angle dα and the differences between the orientations of the normal vectors in order to clarify the trigonometry.

Figure 8:
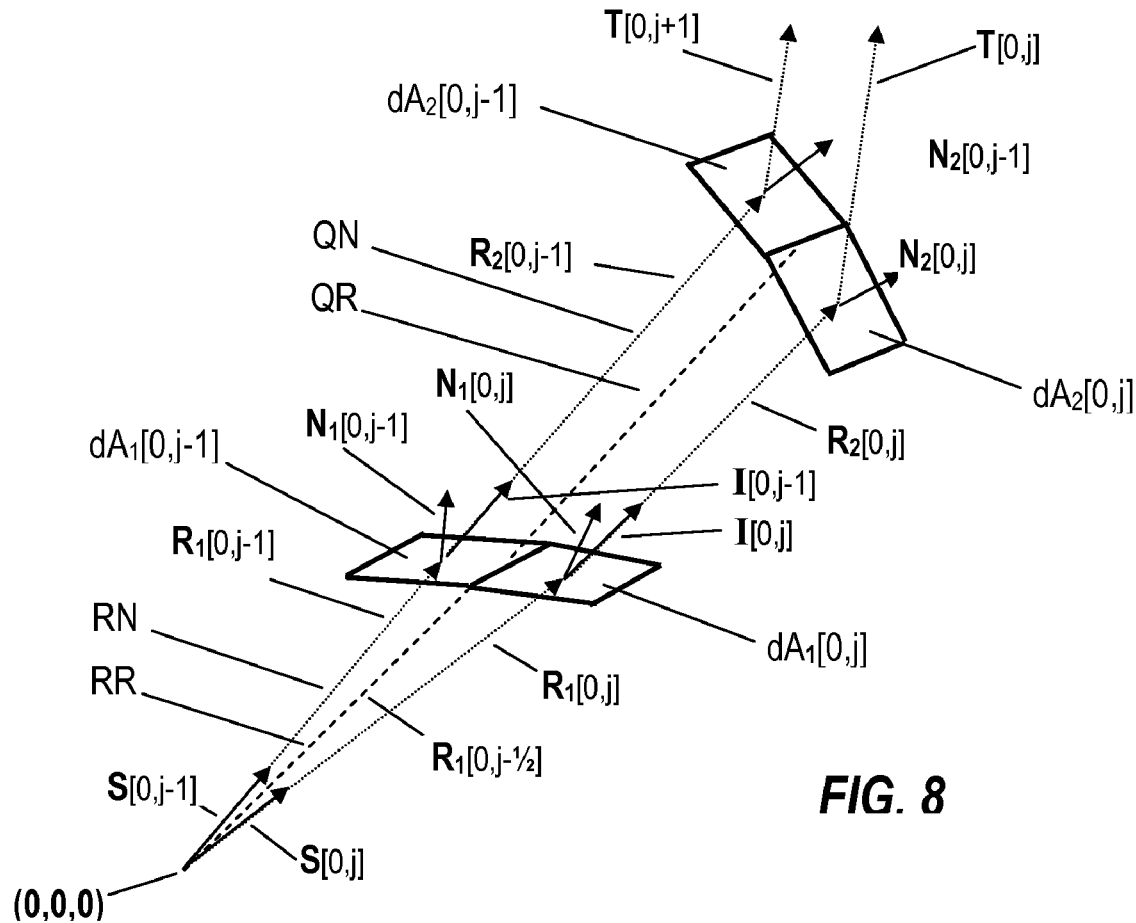
FIG. 8 illustrates a characteristic-strip generated using normal vectors.

The trigonometric method of FIGS. 6 and 7 works well when the characteristic strips are nearly planar, but a more general method is available by working directly with the vectors. FIG. 8 illustrates a schematic diagram of this derivation. FIG. 8 shows the origin (0,0,0) and adjacent source vectors S[0,j] and S[0,j−1] along row 0, which is the first characteristic strip of the surface, which begins with j=N, the grid size. A previously known starting point at location vector $R_1[0,j]$ is the origin of known displacement vector $R_2[0,j]$ to the previously known starting point of the external surface. Instead of the tangential line segments of FIG. 6, the general method of FIG. 8 uses tangential elemental patches dA with normal vectors N at their centers, respectively $dA_1[0,j]$ and $N_1[0,j]$, etc. With patch $dA_1[0,j]$ fixed at a known location given by location vector $R_1[0,j]$, the next patch $dA_1[0,j-1]$, as oriented by known surface-normal vector $N_1[0,j]$, will slide along a ray extending from known unit vector S[0,j−1], until an optimum value RN is found that aligns the next patch with the fixed patch $dA_1[0,j]$. This alignment is such as to assure surface continuity.

The vector equation for every point p on any plane with normal vector n, and going through a known point x, is n·(p−x)=0. This equation can be adapted to first find the length RR of the intermediate location vector $R_1[0,j-½]$, which lies along the bisector of the known unit vectors S[0,j] and S[0,j−1], and also lies in the plane of patch $dA_1[0,j]$. This key length is given as follows:

$$RR = \frac{N_1[0,j] \cdot R_1[0,j]}{N_1[0,j] \cdot S[0,j-1/2]}$$

Now that it is known, this same vector $R_1[0,j+½]$ also lies in patch $dA_1[0,j+1]$, yielding:

$$RN = \frac{N_1[0,j-1] \cdot R_1[0,j-1/2]}{N_1[0,j-1] \cdot S[0,j-1]}$$

The intermediate direction vectors I[0,j] and I[0,j−1] are aligned with patches $dA_1[0,j]$ and $dA_1[0,j+1]$, and corresponding external surface vectors $dA_2[0,j]$ and $dA_2[0,j-1]$ are located along those direction vectors, the former patch at a known location and the latter's location to be determined. In the same scalar-product way the scalar magnitudes QN and QR are calculated:

$$QR = \frac{N_2[0,j] \cdot R_2[0,j]}{N_2[0,j] \cdot I[0,j-1/2]} \text{ and } QN = \frac{N_2[0,j-1] \cdot R_2[0,j-1/2]}{N_2[0,j-1] \cdot I[0,j-1]}$$

Figure 9:
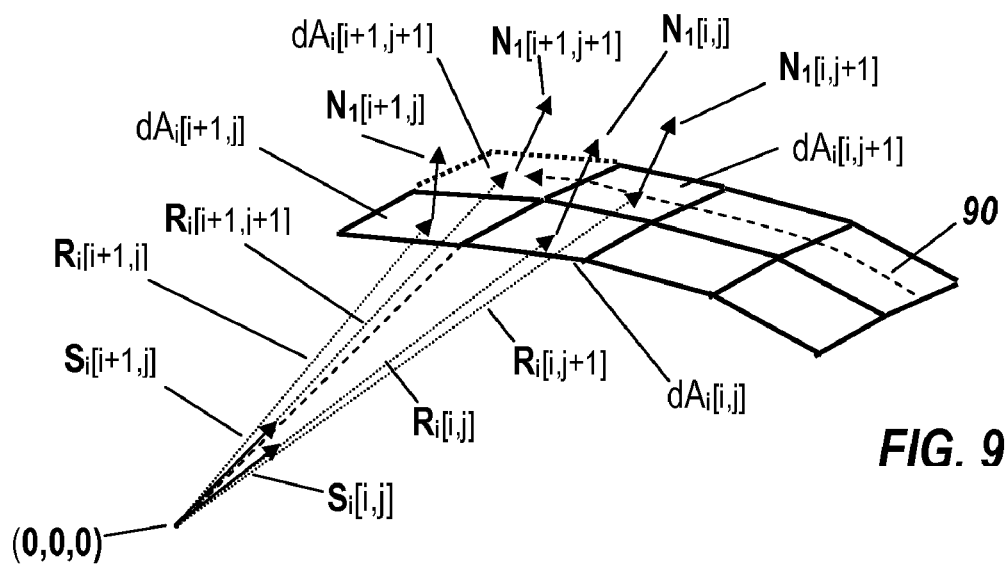
FIG. 9 illustrates strip integration with cross-derivative checking.

When the initial zero-index characteristic strip has been so derived by using the aforementioned equations in the specified step-by-step fashion from cell i to cell i−1, an adjacent strip is generated next at a small transverse distance from the last, in the same way as all subsequent strips will be generated. Any such new strip will differ slightly in shape from the previous one, such that both its own shape as well as its difference from the previous one will generate the proper surface. The new strip's initial points $R_1[1,N]$ on the interior lens surface and $R_2[1,N]$ on the exterior are generated in the same vector-mathematical fashion from the starting points of the initial strip. FIG. 9 illustrates how a further characteristic strip 90 is generated and checked by the previously generated adjacent strip. The unknown location of elemental patch $dA_2[i+1,j+1]$ is first generated from previous patch $dA_2[i+1,j]$ on the strip 90 in the aforementioned vector fashion. Then the location is generated again from adjacent patch $dA_2[i,j+1]$ on the previous strip. Since a slight discrepancy is typical of a set of required surface-normal vectors generated by rectangular illumination situations, a reconciled value somewhere between the two is adopted. The reconciled value is selected to minimize the angular error of the normal vectors of the actual surface versus the required vectors. One of the reasons for the aforementioned variable load-sharing between the first and second lens surfaces of the required ray deflections is to generate sets of normal vectors with minimal violation of the aforementioned equality of crossed derivatives.

The design method disclosed herein can be summarized as follows:

1. Establish a pseudo-rectangular source grid on an imaginary sphere of directions that cover the entirety of the source emission, such that every cell represents the same amount of light. The lenses shown in the following Figures were generated by grids for which N=50, so that their surface ruling grids are 101×101 in size.

2. Establish a corresponding rectangular grid on the target. At first the grid cells will be all the same size, but it is possible to distort the grid in order to enlarge cells that were under-illuminated by a previously generated lens, in order to generate a modified one with uniform illumination. This can easily arise when Fresnel reflection losses are taken into account, because the losses increase with deflection, causing rays going to the corners to be less luminous. It can also arise when the light source is not ideally small, so that distortions of the source-image lead to non uniformity.

3. Establish the set of unit vectors S[i,j] that point to the cells of the pseudo-rectangular source grid and the set T[i,j] that point to the target.

4. Establish a trial set of intermediate unit vectors I=½(T−S) that bisect these vectors, representing a 50-50 split of the bend load. From these generate the sets of normal vectors $N_1$ and $N_2$ for the lower surface and the upper surface of the lens.

5. Check the trial sets of required inside and outside-surface normal vectors for cross-derivative equality, and minimize the total inequality by slightly varying the intermediate unit vectors I away from their 50-50 positions.
6. From this minimal-discrepancy set of normal vectors, generate the illumination lens by the aforementioned vector-based generation of first and successive characteristic strips. After each successive strip is generated, all the previous strips can be re-adjusted accordingly, to minimize the total deviation of the actual normal vectors from the required ones. In numerical computing this is known as "annealing."
7. Run a Monte-Carlo ray trace to determine uniformity of target illuminance. Deviations therefrom can be used to appropriately distort the target grid when repeating Step 2. In actual practice, this method relies on digitized photometrically calibrated imagery being accurately translated into Monte-Carlo ray sets representing the source emission, as by equipment and software sold by Radiant Imaging Corporation.

This method generated an illumination lens for a ±60° source and a target subtending 45° by 60°. FIG. 10A illustrates this with a side view of illumination lens 100, with an outer surface 101 protruding prominently and with a mounting flange 102. An LED package 104 has an emission area (emitter) 105 that is almost too large to qualify as a small source, but the method of the present invention compensates for this in the second round of the aforementioned design steps.

FIG. 10B illustrates a perspective view of the lens 100 from below, which also shows a relatively flat lower surface 103, which actually has a saddle-shape due to the 2:1 differing target dimensions.

Figures 10C, 10D:
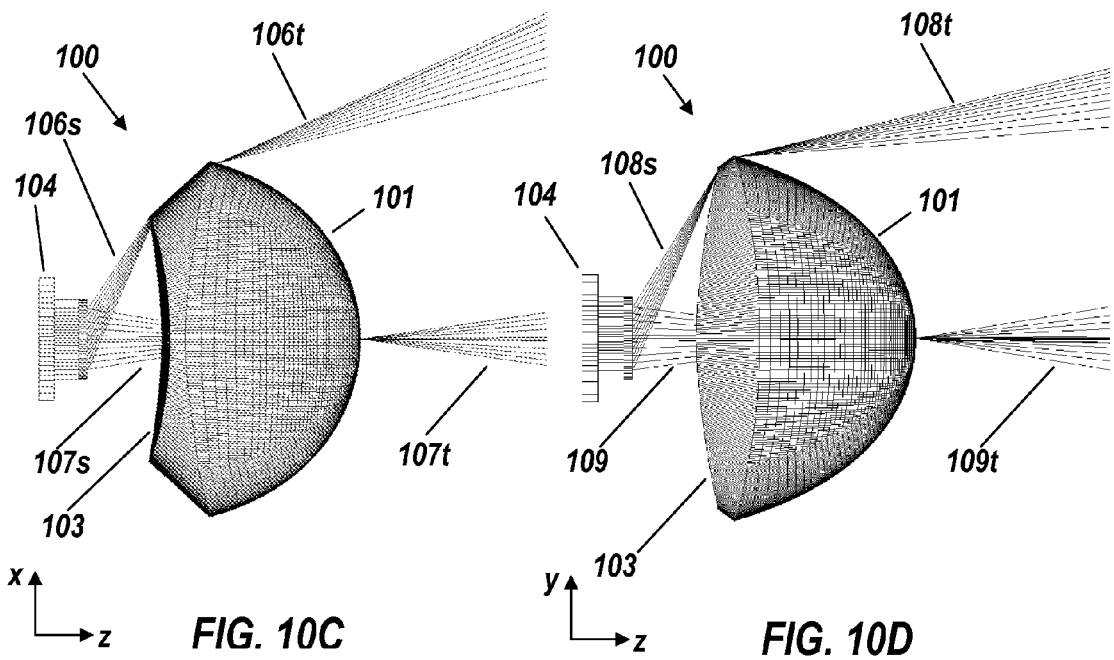
FIG. 10C illustrates a side view of the narrow-beam free-form lens of FIG. 10A from the y-direction.
FIG. 10D illustrates a side view of the narrow-beam free-form lens of FIG. 10A from the x-direction.
Figures 10A, 10B:
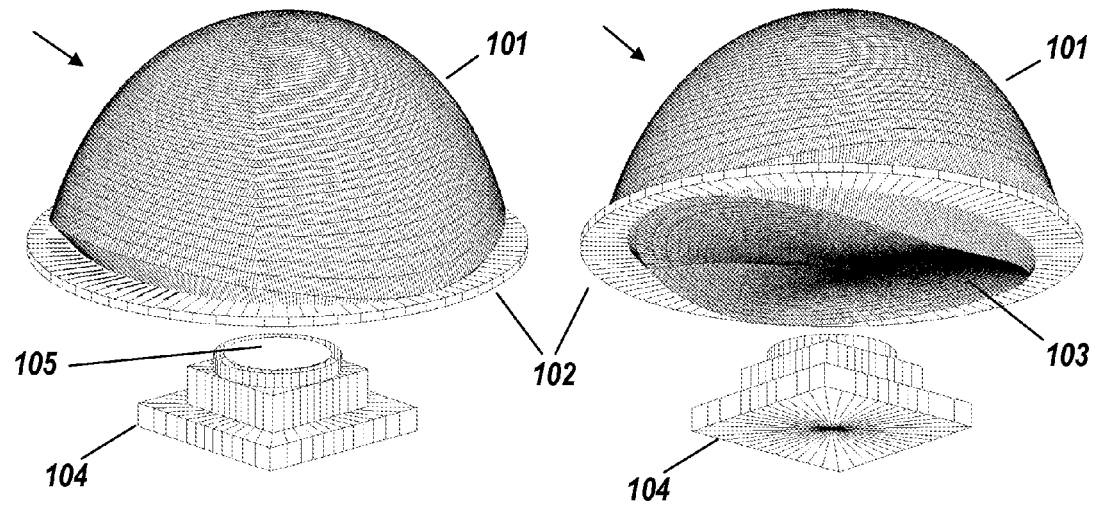
FIG. 10A illustrates a perspective view from above of a narrow-beam free-form lens.
FIG. 10B illustrates a perspective view of the narrow-beam free-form lens of FIG. 10A from below.

FIG. 10C illustrates a side view of the lens 100 showing its x-z profile, particularly the concave profile of the lower surface 103. The emitter 105 emits a peripheral set 106$s$ of source rays, which the lens 100 deflects to become a set 106$t$ of target rays. Similarly, a set of source rays 107$s$ become a set of target rays 107$t$. The divergence of the rays tends to cause an illumination fall-off from the center, with the edge of the target tending to be under-illuminated, but the second iteration of the aforementioned design steps repairs this deficiency.

FIG. 10D illustrates a side view of the lens 100 showing its y-z profile, including the convex profile of the lower surface 103. The emitter 105 emits a peripheral set 108$s$ of source rays, which the lens 100 deflects to become a set 108$t$ of target rays. Similarly, a set of source rays 109$s$ become a set of target rays 109$t$.

Figure 11:
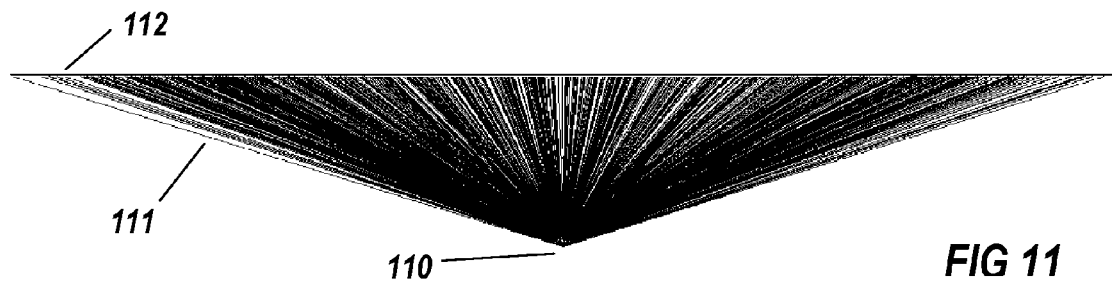
FIG. 11 illustrates a side view of wide-angle illumination pattern provided by the lens of FIGS. 10A-10D.

FIG. 11 illustrates a wide-angle illumination requirement for a small source 110 to radiate a set of rays 111 such that a close rectangular target 112 is uniformly illuminated, even though the target 112 subtends an angle of ±75° with respect to the small source 110.

Figure 12:
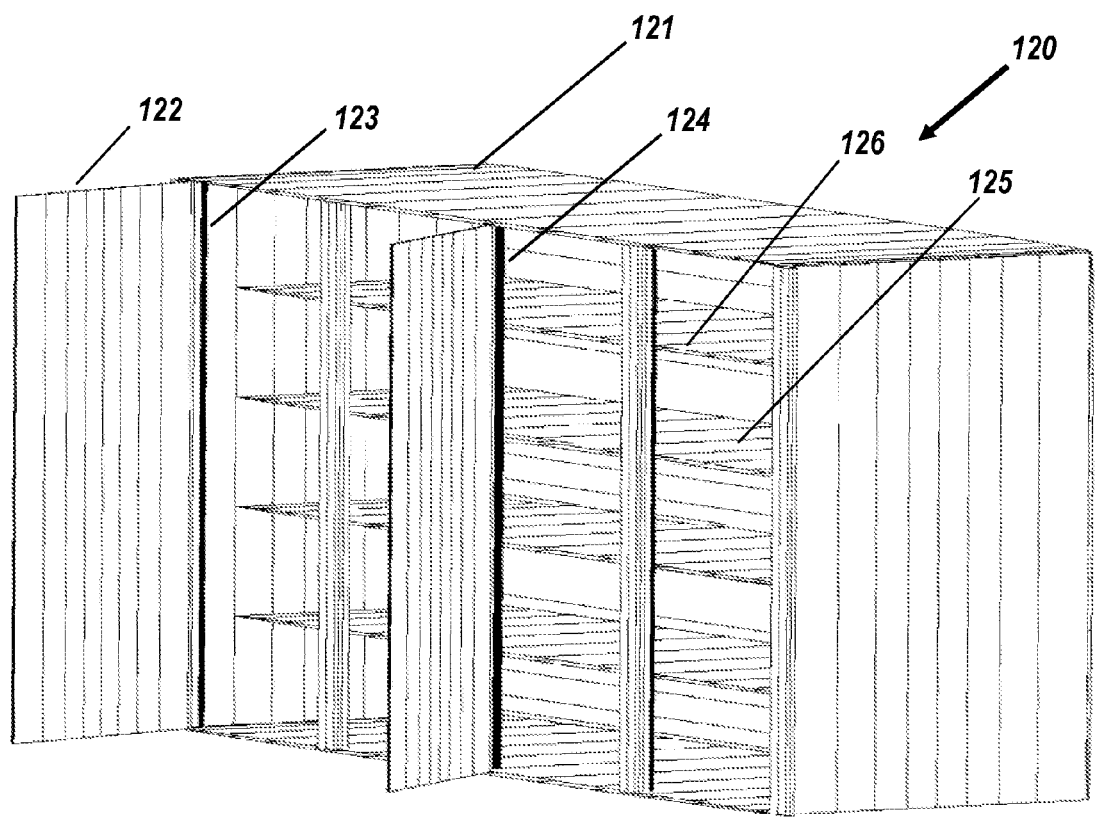
FIG. 12 illustrates a perspective view of a display case into which a row of LED lights having the lens of FIGS. 10A-10D are advantageously incorporated to provide a shelf light having the wide-angle illumination pattern of FIG. 11.

FIG. 12 illustrates a typical application of the light source that produces the illumination requirement illustrated in FIG. 11 in a refrigerated display case 120. The display case 120 comprises an outer case 121 having transparent doors 122. The doors 122 are hinged at an end-mullion 123 and at a center mullion 124. A row of lights (not shown) is positioned behind each mullion 123, 124 to produce the illumination pattern of FIG. 11 that shines horizontally inwards to illuminate items for sale (not shown) on the front edges 125 of a set of horizontal shelves 126.

Figure 13A:
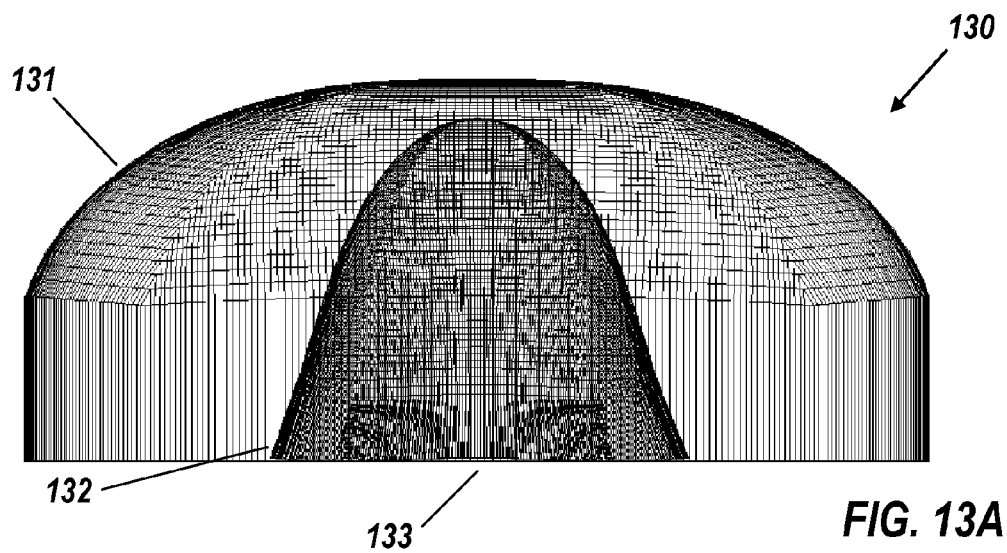
FIG. 13A illustrates a side view of a wide-angle free-form lens.

FIG. 13A illustrates a side view of an illumination lens 130 designed for the illumination situation of FIG. 11. An upper surface 131 defines a quasi-ellipsoidal profile. The lens 130 includes an arch-shaped lower surface 132, which results in considerable lens thickness. The light source is to be placed at a central point 133.

Figure 13B:
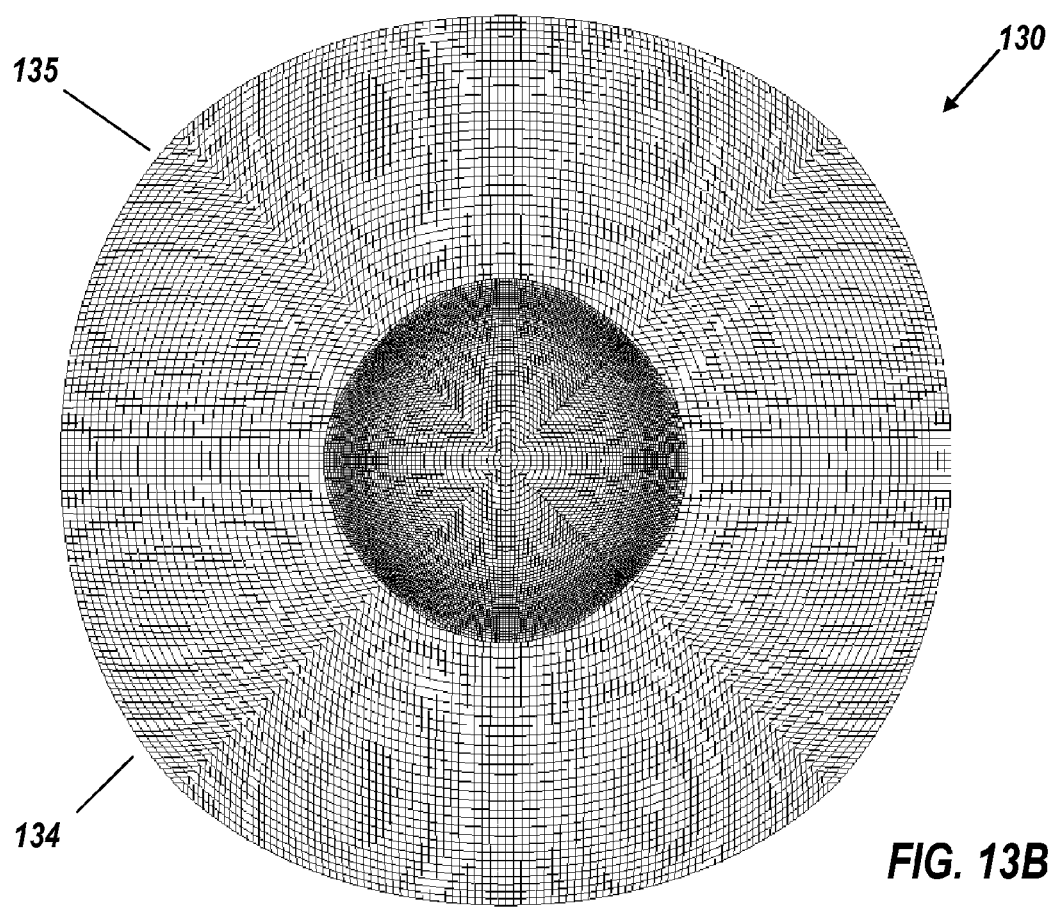
FIG. 13B illustrates a plane view of the wide-angle free-form lens of FIG. 13A showing its non-circular shape.

FIG. 13B illustrates a plan view of the lens 130 of FIG. 13A, showing a somewhat non-circular outer profile 134 and inner profile 135. The two profiles have complementary departures from circularity—the outer profile 134 bulges out at the corners while the inner profile 135 turns slightly in. These departures suffice to transform the circular emission of a source into the required rectangular pattern of illumination.

FIG. 14 illustrates an example of an extreme oblique presentation for a unit sphere 140 placed over the edge of a target 141. This could be used, for example, in the end mullion 123 of FIG. 12, which has an asymmetric illumination target.

FIG. 15A is an end view of an illumination lens 150, showing a lower surface 151, reminiscent of a bicycle seat, and an upper surface 151, reminiscent of a helmet. A light source 153 with a dome 154 is located with the dome 154 located at the coordinate origin. FIG. 15B, FIG. 15C, and FIG. 15D are perspective views from various angles serving to elucidate the complex structure of this lens. This strongly curved piece closely approximates the normal vectors required for the challenging illumination geometry of FIG. 14. In FIGS. 15A, 15B, 15C and 15D, the solid transparent material between the lower surface 151 and the upper surface 152 is not shown so that the two surfaces can be visualized.

As illustrated in FIG. 13A and FIG. 13B, both the upper surface 131 and the lower surface 132 of the lens 130 are free-form, with each surface providing approximately half of the bending required to redistribute the source's light over a large planar target located close to the lens. Free-form surfaces are inherently more expensive to produce for a mold-insert than rotationally symmetric surfaces. Since the lower surface 132 is much smaller than the upper surface 131, it would be advantageous if the lower surface 132 could be made rotationally symmetric. This would require the upper surface 131 to have a greater departure from a circle than shown in FIG. 13B, since the upper surface 131 must shoulder the entire requirement for producing a non-circular output pattern. Accordingly, the above-discussed Step 4 is modified so that the lower-surface profile is derived only once, on the x-axis. The derived lower-surface profile is used for all azimuths around the circle to generate rotational symmetry. To compensate for the rotationally symmetric lower surface 132, the upper surface 131 becomes even more non-circular. There is a well-known geometric shape that has not been previously used in optics—the super-ellipsoid. The super-ellipsoid is described by the implicit equation:

$$\left(\frac{x}{a}\right)^P + \left(\frac{y}{b}\right)^Q + \left(\frac{z - z_0}{c}\right)^R = 1$$

In the foregoing equation, a, b, and c are the usual semi-axis lengths, but the exponents P, Q, and R are not equal to 2 (which describes a conventional ellipsoid). Increasing any two of the exponents causes their cross-section to become more rectangular. The lens is centered at vertical coordinate $z_0$, in order to provide for variations in lens position above the source. The super-ellipsoid shape can be implemented in a standard lens-optimization program in order to find the best parameter values for the super-ellipsoid, along with the best shape for the lower surface.

Figure 16A:
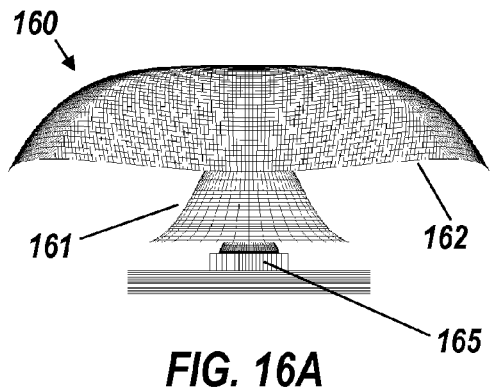
FIGS. 16A, B, C, D, E, & F illustrate views of a super-ellipsoid lens.
Figure 16B:
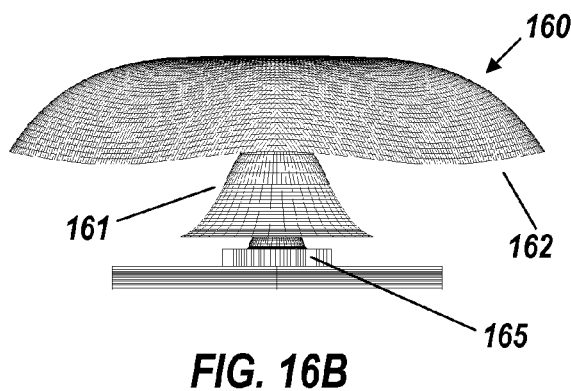
Figure 16C:
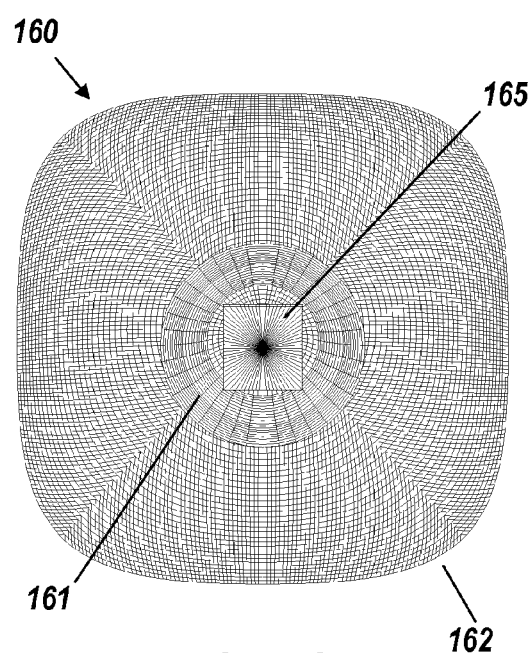
Figure 16D:
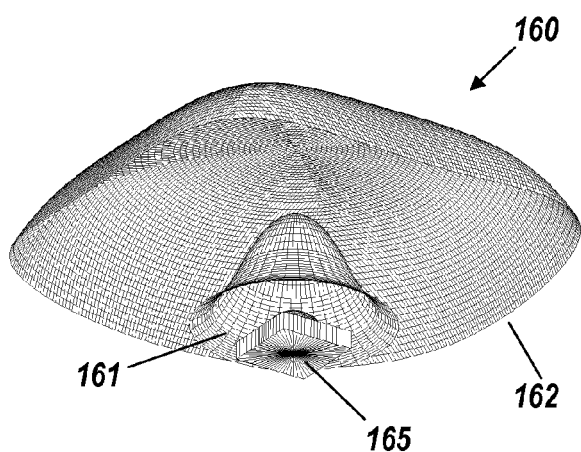
Figure 16E:
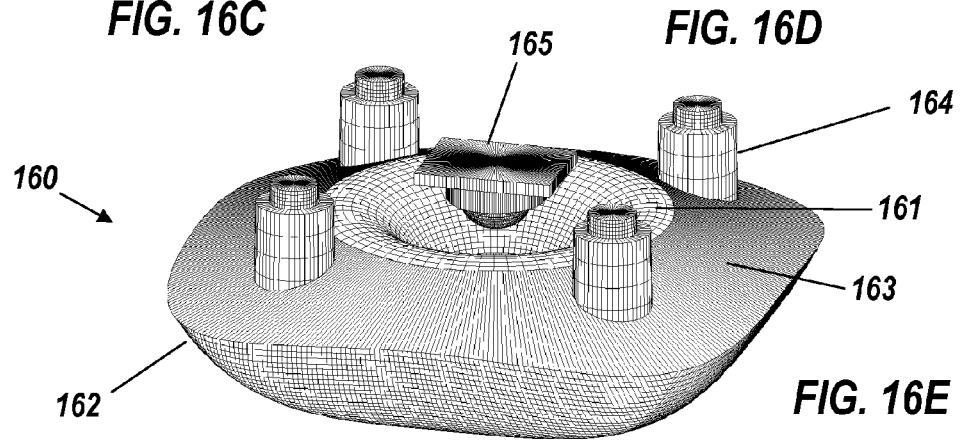
Figure 16F:
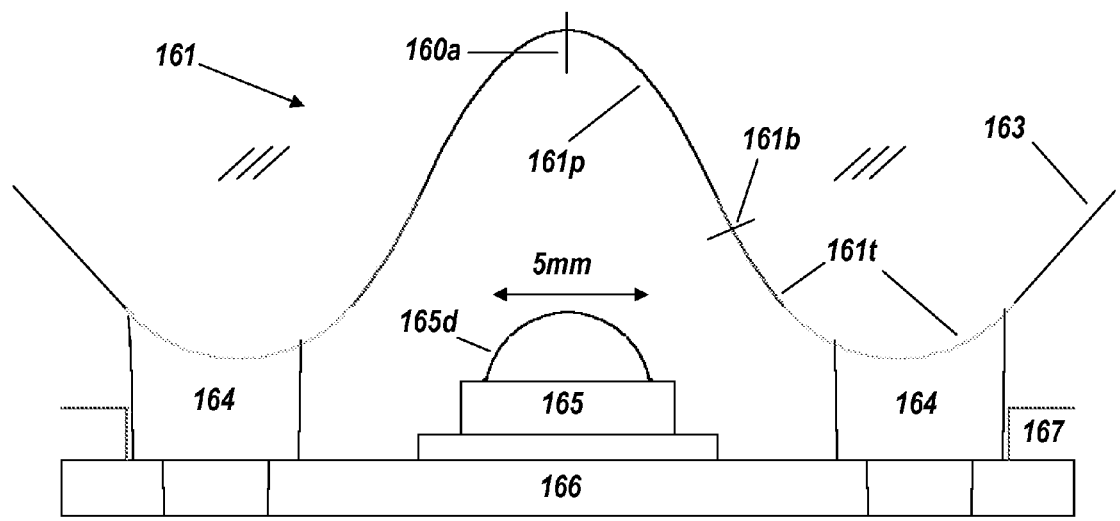

For the particular illumination situation of the refrigerator case of FIG. 12, a particular super-ellipsoid closely matches the shape derived by the above-disclosed 7-step algorithm, namely one with P=Q=4 and with R=1.3. FIG. 16A illustrates a partially cut-away 3D side-view of a super-ellipsoid lens 160, which comprises a bell-shaped circularly symmetric lower surface 161 and a super-ellipsoid upper surface 162. FIG. 16A also illustrates a domed LED package 165 that acts as a light source. FIG. 16B illustrates a diagonal view of the lens 160, showing the greater length of the diagonal dimension. FIG. 16C illustrates a bottom view of the lens 160, showing how the shape of super-ellipsoid top surface 162 is formed as a rounded square. FIG. 16D illustrates a perspective view of the lens 160 that fully shows the bell shape of lower surface 161. FIG. 16E illustrates another perspective view that also shows an optically inactive conical transition surface 163 and a plurality of mounting pegs 164 (e.g., four mounting pegs in the illustrated embodiment). FIG. 16F is a cross-sectional close-up view of the bell-shaped lower surface 161, the conical transition surface 163, and the mounting pegs 164. FIG. 16F also shows the LED package 165 and a cross section of a circuit board 166. The circuit board 166 includes holes into which the pegs 164 are inserted. FIG. 16F also shows a portion of an edge of a mounting bracket 167. The LED package 165 has transparent dome 165d that is approximately 5 millimeters in diameter. The lower surface 161 has an axis of rotational symmetry 160a. In the illustrated embodiment, the lower surface 161 comprises a central paraboloid 161p with a toroidal section 161t surrounding the central paraboloid. The toroidal section 161t is tangent to the central paraboloid at a line 161b. In FIGS. 16A, 16B, 16C and 16D, the solid transparent material between the lower surface 161 and the upper surface 162 is not shown so that the two surfaces can be visualized. The solid material between the two surfaces is shown in FIG. 16E.

An advantageous aspect of this type of super-ellipsoid lens is a kind of division of labor in the development of a lens for a particular application. The rotationally symmetric bell-shaped lower surface 161 can be easily altered by switching out the mold insert, so that LED packages can be accommodated with different angular distributions of intensity. The more costly super-ellipsoid upper surface 162 can be tailored to uniformly illuminate a particular square or rectangular target plane by altering the semi-axis lengths a, b, and c and altering the exponents P, Q, and R. The lens of FIG. 16 has been successfully molded, proving to be quite good at producing the requisite square pattern, with surprisingly sharp corners. The installation of FIG. 12 is a typical application of an array of the lens of FIG. 16.

The size of the lens 160 in FIG. 16 can be scaled from the 5 millimeters diameter of the LED dome 165d in FIG. 16F. Considering the economic pressure to minimize lens thickness, it is important to note that the illuminance at any point on the target is proportional to the product of the LED's luminance and the solid angle of the source image projected by the lens. The higher the luminance, the smaller the lens can be. The lens of FIG. 16 was sized so that in FIG. 11 the illuminance at the front of the shelf is approximately 800 Lux when there are a dozen of the lenses in FIG. 16, each with a 1 Watt LED emitting at least 80 Lumens. As LEDs become more luminous the lenses can be made smaller and thus faster to injection-mold.

Figure 17:
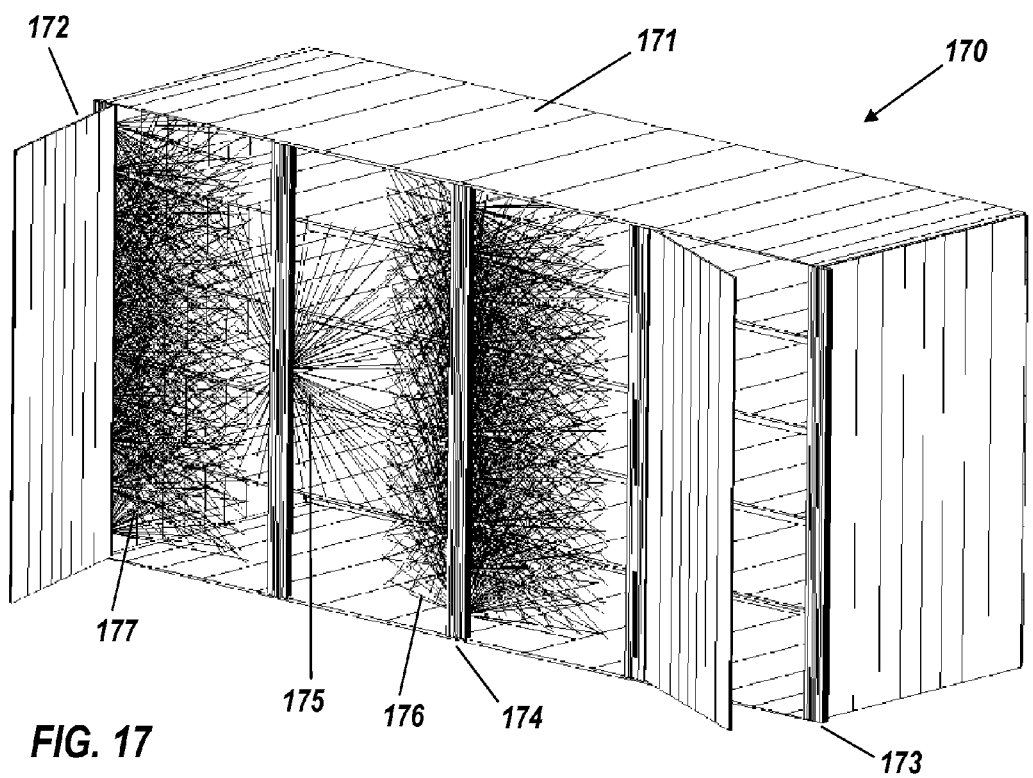
FIG. 17 illustrates the refrigerator case of FIG. 12 with illuminators.

FIG. 17 illustrates an application for the lens 160 of FIG. 16. A refrigerator case 170 comprises an outer case 171 with transparent doors 172 supported by end mullions 173 and a center mullion 174. In conventionally illuminated refrigerator cases, fluorescent tubes are mounted behind the mullions to illuminate products (not shown) on the shelves of the refrigerator case 170. Such tubes have disadvantageously nonuniform illumination patterns, leading to low illuminance between the mullions. In FIG. 17, a square illumination pattern 175 illustrates how a single lens of FIG. 16 operates to assure uniformity of illumination. An illumination pattern 176 is the result of a dozen of such square illumination patterns overlapping. A half-pattern 177 can also be obtained by using lenses with built-in mirrors, as shown in FIG. 18.

Figure 18:
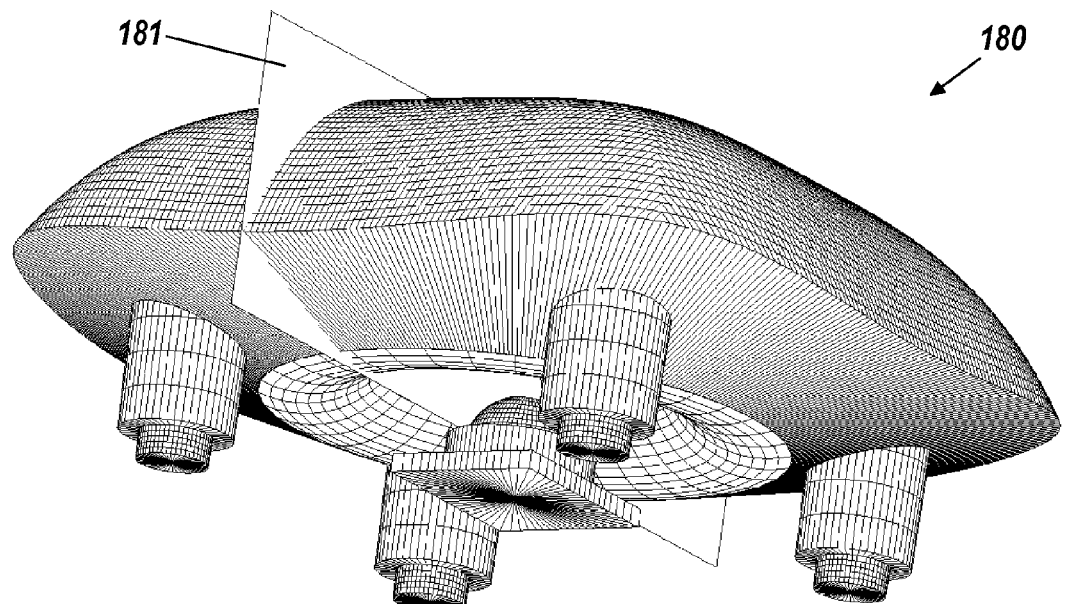
FIG. 18 illustrates a lens with a vertical mirror.

FIG. 18 illustrates a super ellipsoid lens 180 substantially the same as the lens 160 of FIG. 16 but also comprising vertical mirror 181, which reflects the left part of the lens output light over to the right side. When the lens 180 is installed behind the end-mullion 173 of FIG. 17, fewer lenses are needed, saving both cost and power utilization. Such a lens can also be used at the top and bottom of the center mullions, to save light that would otherwise shine uselessly on the top and bottom of case 171 of FIG. 17.

Figure 19:
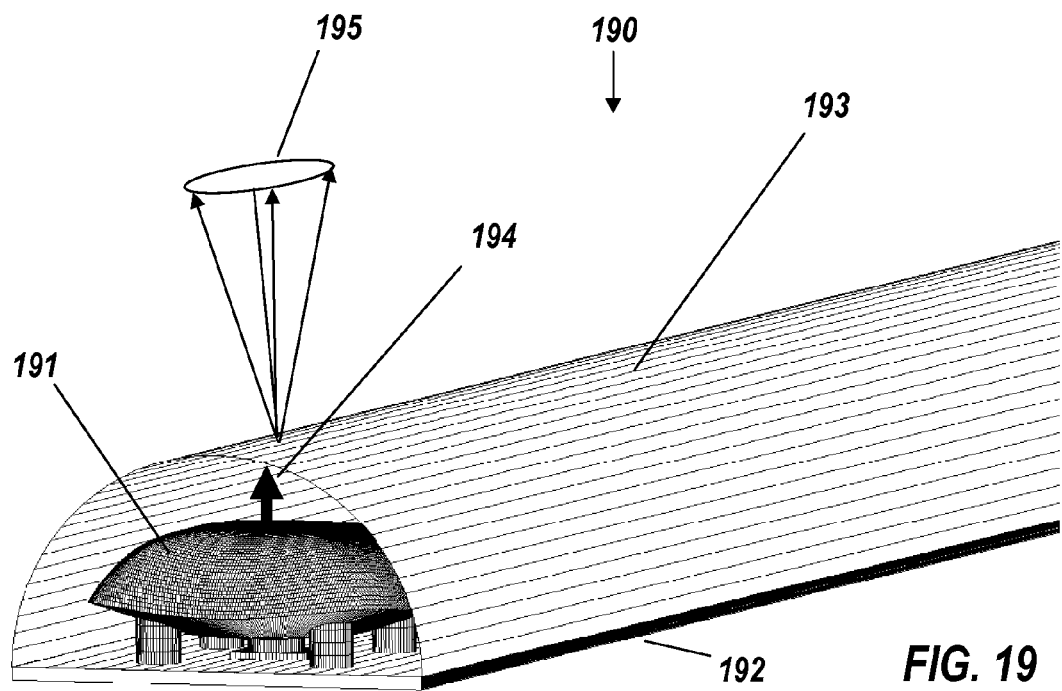
FIG. 19 illustrates an elliptically diffusing cover.

In certain embodiments, the lenses disclosed herein are formed by injection molding of optical grade acrylic having a refractive index of, for example, 1.5. Injection molding of such a thick lens leads to inevitable small imperfections in the substantially uniform square output pattern 175 of FIG. 17. Even when a dozen such patterns are merged into the overall pattern 176, small non-uniformities of illumination will remain. To forestall the non-uniformities being noticed, a diffusing cover can be utilized, as illustrated in FIG. 19. An illumination array 190 comprises multiple copies of an illumination system 191 on a circuit board 192. Each illumination system 191 corresponds to the embodiment illustrated in FIGS. 16A-16F with the circuit board 192 corresponding to the circuit board 166 in FIG. 16F. The lenses and LEDs in the illumination system 191 are protected by a transparent cover 193, which can be made out of a holographic diffuser. Alternatively, a diffuser may be added to the inner surface of a cylindrical cover. In certain embodiments, the cover 193 comprises a polycarbonate or acrylic material. An exemplary output ray 194 goes through the cover 193 and becomes diffused into an elliptical ray bundle 195 so that the optical diffusion is only along the length of the array, but not across it. The diffusion tends to remove residual non-uniformities of the total output of the array.

Figure 20:
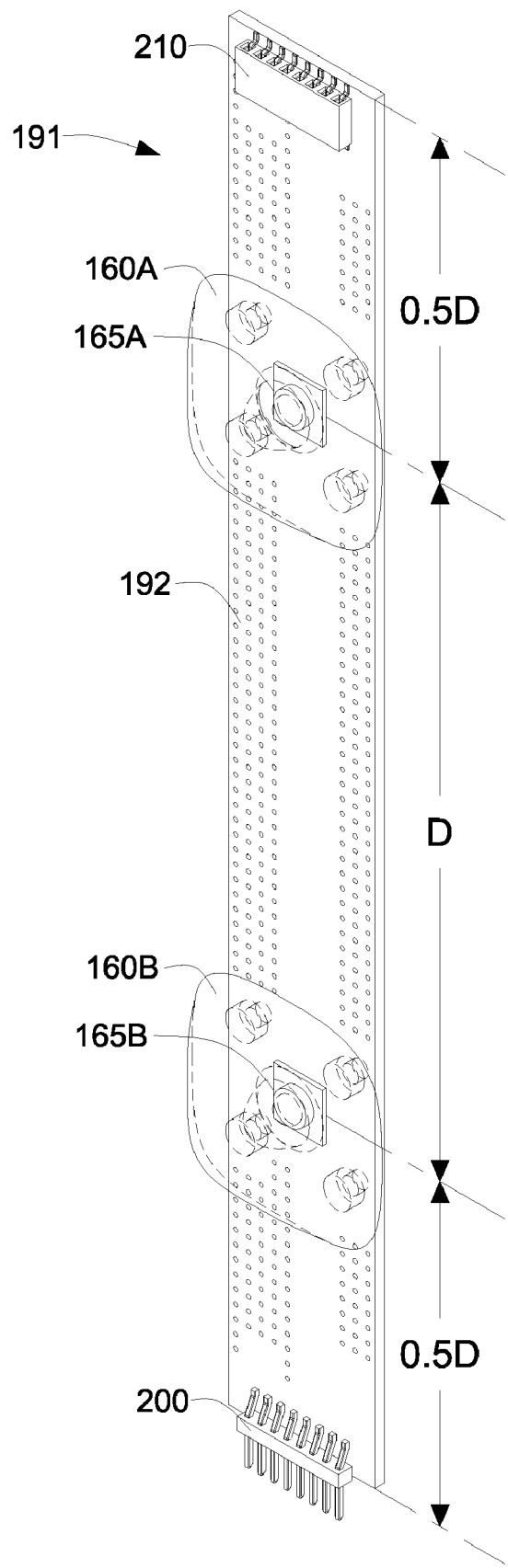
FIG. 20 illustrates an exemplary section of a lighting strip having two LEDs and two lenses mounted thereon.
Figure 21:
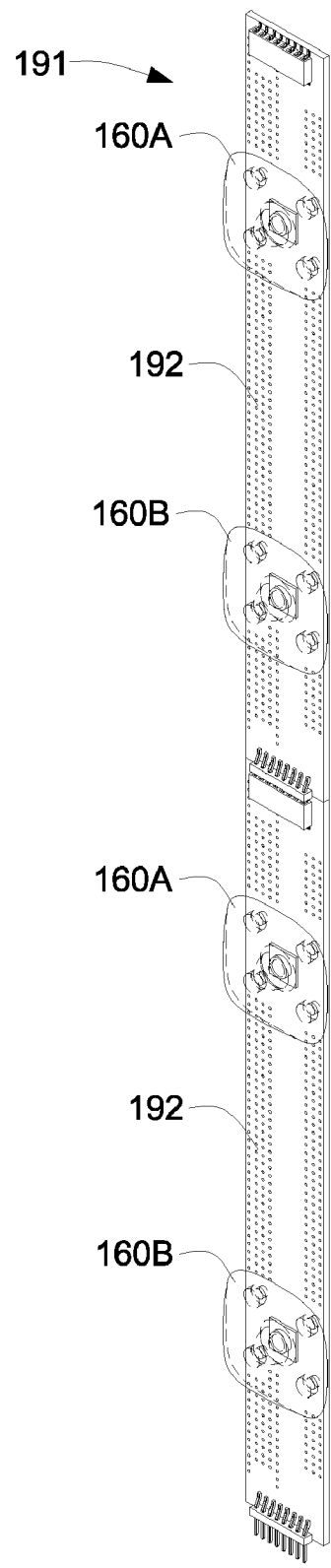
FIG. 21 illustrates two exemplary sections of the lighting strip of FIG. 20 mechanically and electrically interconnected as a strip comprising four LEDs.

FIGS. 20 and 21 illustrate a preferred embodiment of the illumination system 191 of FIG. 19. As illustrated in FIG. 20, the circuit board 192 of the illumination system has a length of approximately 9¼ inches and has a first (upper) lens 160A and an associated first LED assembly 165A spaced apart from a second (lower) lens 160B and an associated second LED assembly 165B by a centerline-to-centerline distance D, which is approximately 4⅞ inches in the illustrated embodiment. The centerline of the upper lens is spaced apart from an upper end of the circuit board by approximately one-half the centerline-to-centerline (e.g., ½ D), and the centerline of the lower lens is spaced apart from a lower end of the circuit board by approximately one-half the centerline-to-centerline distance.

As further illustrated in FIG. 20, a lower connector 200 is positioned on the circuit board 192 proximate the lower end. In the illustrated embodiment, the lower connector comprises 8 pins; however, only two of the pins are used to provide relatively positive voltage (e.g., +5 volts) to the circuit board via one of the pins and to provide a relatively negative voltage (e.g., 0 volts or ground) to the circuit board via the other pin. The two voltages are provided to the LED assemblies 165A, 165B. The other six pins in the lower connector advantageously provide additional mechanical interconnection forces when the lower connector is mated with a connector comprising sockets.

As further illustrated in FIG. 20, an upper connector 210 is positioned on the circuit board 192 proximate the upper end. In the illustrated embodiment, the upper connector comprises 8 sockets that are engageable with the pins of a lower connector of a second circuit board as shown in FIG. 21. Again, only two of the sockets are used to connect to the relatively positive voltage and the relatively negative voltage (e.g., 0 volts or ground) on the circuit board. The sockets connected to the voltages correspond to the pins connected to the voltages so that when the pins of the second circuit board are connected to the sockets of the circuit board in FIG. 20, the voltages are coupled to the second circuit board. When the two circuit boards are interconnected as shown in FIG. 21, the centerline of the lower lens 160B of the upper circuit board is spaced apart from the centerline of the upper lens 160A of the lower circuit board by approximately the same distance D as the two lenses are spaced apart on each circuit board. Additional circuit boards (not shown) are advantageously connected to the illustrated circuit boards to provide an illumination system 191 of a desired length.

Although shown in a vertical position in FIGS. 20 and 21, the circuit boards can also be positioned horizontally, as shown in FIG. 19.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. An illumination system comprising a light source, an illumination lens, and at least one rectangular target zones, the light source emitting light into a solid angle exceeding pi steradians with a known intensity distribution, the illumination lens comprising a first surface that receives at least 90% of the light of the known intensity distribution, the first surface shaped to transform the known intensity distribution into an intermediate intensity distribution within the transparent material of the lens, the lens further comprising a second surface that receives the intermediate intensity distribution, the second surface shaped to transform the intermediate intensity distribution into a final intensity distribution that produces a prescribed illumination distribution upon the at least one rectangular target zone, at least one of the shapes of the first and second surfaces being non-rotationally symmetric and being mathematically generated by:
   identifying a rectangular grid on the target; and;
   in correspondence with the rectangular grid on the target, establishing a sphere-covering pseudo-rectangular grid on the solid angle of the source emission, wherein:
      the pseudo-rectangular grid has the same proportions and the same number of cells as the rectangular grid on the target;
      the cells of the rectangular grid on the target and the cells of the pseudo-rectangular grid have the same relative assignment of light flux; and
   each cell has a representative central ray.

2. The illumination lens as defined in claim 1, wherein the lower surface is rotationally symmetric.

3. The illumination lens as defined claim 1, comprising an upper surface that is a super-ellipsoid described by an equation:

$$\left(\frac{x}{a}\right)^P + \left(\frac{y}{b}\right)^Q + \left(\frac{z-z_0}{c}\right)^R = 1$$

wherein a, b, and c are adjustable semi-axes, $z_0$ is an adjustable vertical position, and P, Q, and R are adjustable exponents, with at least one of the exponents not equal to 2.

4. The illumination lens as defined in claim 3, wherein the equation has exponent P 4, the exponent Q=4 and the exponent R=1.4.

5. The illumination lens as defined in claim 2 also comprising a lower surface that is bell-shaped.

6. The illumination lens as defined in claim 5 wherein the bell-shaped lower surface comprises a central paraboloid and a lower toroidal section surrounding it, the toroidal section adjoining thereto with the same tangent as the paraboloid, the central paraboloid adjustable both in vertex radius of curvature and in the amount of higher-order modification, the toroidal section adjustable both in radius of curvature and the variability thereof.

7. The illumination lens as defined in claim 6 also comprising mounting pegs protruding downward from the transition surface.

8. The illumination lens as defined in claim 2 also comprising a conical transition surface connecting the lower surface and the upper surface.

9. The illumination lens as defined in claim 2, also comprising a mounting flange protruding laterally from the transition surface.

10. The illumination lens as defined in claim 1, also comprising a vertically oriented planar mirror positioned adjacent to the light source so as to reflect light back across the center of the lens.

11. The illumination system as defined in claim 1 comprising a multiplicity of the lenses and light sources positioned to form a linear array, also comprising a transparent diffusing cover with its diffusion predominantly in the direction of the array.

12. An illumination system comprising a light source, an illumination lens, and at least one rectangular target zones, the light source emitting light into a solid angle exceeding pi steradians with a known intensity distribution, the illumination lens comprising a first surface that receives at least 90% of the light of the known intensity distribution, the first surface shaped to transform the known intensity distribution into an intermediate intensity distribution within the transparent material of the lens, the lens further comprising a second surface that receives the intermediate intensity distribution, the second surface shaped to transform the intermediate intensity distribution into a final intensity distribution that produces a prescribed illumination distribution upon the at least one rectangular target zone, at least one of the shapes of the first and second surfaces being non-rotationally symmetric.

* * * * *